(12) United States Patent
Buffett-Kennedy

(10) Patent No.: US 12,297,045 B1
(45) Date of Patent: May 13, 2025

(54) METHOD AND SYSTEM FOR MANAGING SHAREABLE STORAGE OF GOODS AMONG USERS IN A COMMUNITY

(71) Applicant: Noah Buffett-Kennedy, San Francisco, CA (US)

(72) Inventor: Noah Buffett-Kennedy, San Francisco, CA (US)

( * ) Notice: Subject to any disclaimer, the term of this patent is extended or adjusted under 35 U.S.C. 154(b) by 809 days.

(21) Appl. No.: 16/594,052

(22) Filed: Oct. 6, 2019

(51) Int. Cl.
*B65G 1/137* (2006.01)
*G06Q 30/0283* (2023.01)

(52) U.S. Cl.
CPC ....... *B65G 1/1371* (2013.01); *G06Q 30/0283* (2013.01)

(58) Field of Classification Search
CPC .......................... B65G 1/1371; G06Q 30/0283
See application file for complete search history.

(56) References Cited

U.S. PATENT DOCUMENTS

| | | | | |
|---|---|---|---|---|
| 5,600,114 A | * | 2/1997 | Dunlap | G06Q 20/18 902/35 |
| 6,694,217 B2 | * | 2/2004 | Bloom | G07C 9/21 700/242 |

(Continued)

FOREIGN PATENT DOCUMENTS

| CN | 198882 A | 6/2007 |
|---|---|---|
| CN | 104617704 A | 5/2015 |

*Primary Examiner* — Kyle O Logan
(74) *Attorney, Agent, or Firm* — Suiter Swantz IP

(57) ABSTRACT

The shareable storage system disclosed herein facilitates the shared use of goods among a community of users, efficiently utilizes resources in a community, and increases the community's use and enjoyment of public areas. Apparatuses and methods that improve the manner in which goods are delivered to and received by consumers are also disclosed. An embodiment of a shareable storage system comprises of one or more storage stations adapted to communicate with user devices wherein said communication may be directly, through a server, through a telecommunications network, or a combination thereof. In a preferred embodiment, a storage station comprises of a structure, one or more containers operably connected to the structure; and a processor operably connected to the one or more containers that controls access to at least one of the one or more containers.

The system may further comprise a power supply wherein said power supply may be solar-powered, battery-powered, an electrical grid, or a combination thereof; a plurality of sensors that obtain data wherein said data is used to, for example, operate the storage station, prevent theft, and verify user identities; at least one database on a computer-readable medium containing information regarding users, inventory, properties of the storage station, or a combination thereof; a graphical user interface ("GUI") operably communicating with the processor wherein the GUI allows a user to select an item stored in the storage station and to obtain the selected items by unlocking one or more containers. In a preferred embodiment, the processor calculates a charge for the temporary use of an item based on information relating to the item, including for example, the length of time the item has held by other users, the number of uses, the unique number of uses, or a combination thereof.

7 Claims, 30 Drawing Sheets

(56) References Cited

U.S. PATENT DOCUMENTS

| | | | |
|---|---|---|---|
| 9,120,624 B1* | 9/2015 | Cassady | G06Q 10/0836 |
| 9,940,583 B1* | 4/2018 | Pillai | G06Q 30/02 |
| 10,638,848 B1* | 5/2020 | Wesley | A47C 11/00 |
| 2004/0250844 A1 | 12/2004 | Kumazaki | |
| 2005/0155622 A1 | 7/2005 | Leis | |
| 2009/0240528 A1* | 9/2009 | Bluth | A61B 5/6888 |
| | | | 348/739 |
| 2010/0127013 A1* | 5/2010 | Butler | G06Q 20/18 |
| | | | 221/199 |
| 2011/0238296 A1* | 9/2011 | Purks | G06Q 30/0639 |
| | | | 705/26.7 |
| 2014/0039998 A1* | 2/2014 | Hancock | G06Q 30/06 |
| | | | 705/14.23 |
| 2015/0088307 A1* | 3/2015 | Ackerman | G06Q 10/087 |
| | | | 700/241 |
| 2015/0088694 A1* | 3/2015 | Ackerman | G06Q 30/0641 |
| | | | 705/28 |
| 2015/0158679 A1* | 6/2015 | Lossov | B65G 1/06 |
| | | | 414/298 |
| 2015/0332206 A1* | 11/2015 | Trew | G06Q 10/0836 |
| | | | 705/330 |
| 2016/0260159 A1* | 9/2016 | Atchley | H02J 7/0013 |
| 2018/0368899 A1* | 12/2018 | Şahin | A61B 17/8802 |
| 2019/0172041 A1* | 6/2019 | Hill | G06Q 20/202 |
| 2020/0005229 A1* | 1/2020 | Durkee | B65G 1/06 |
| 2022/0083957 A1* | 3/2022 | Shelton | G06K 17/00 |

\* cited by examiner

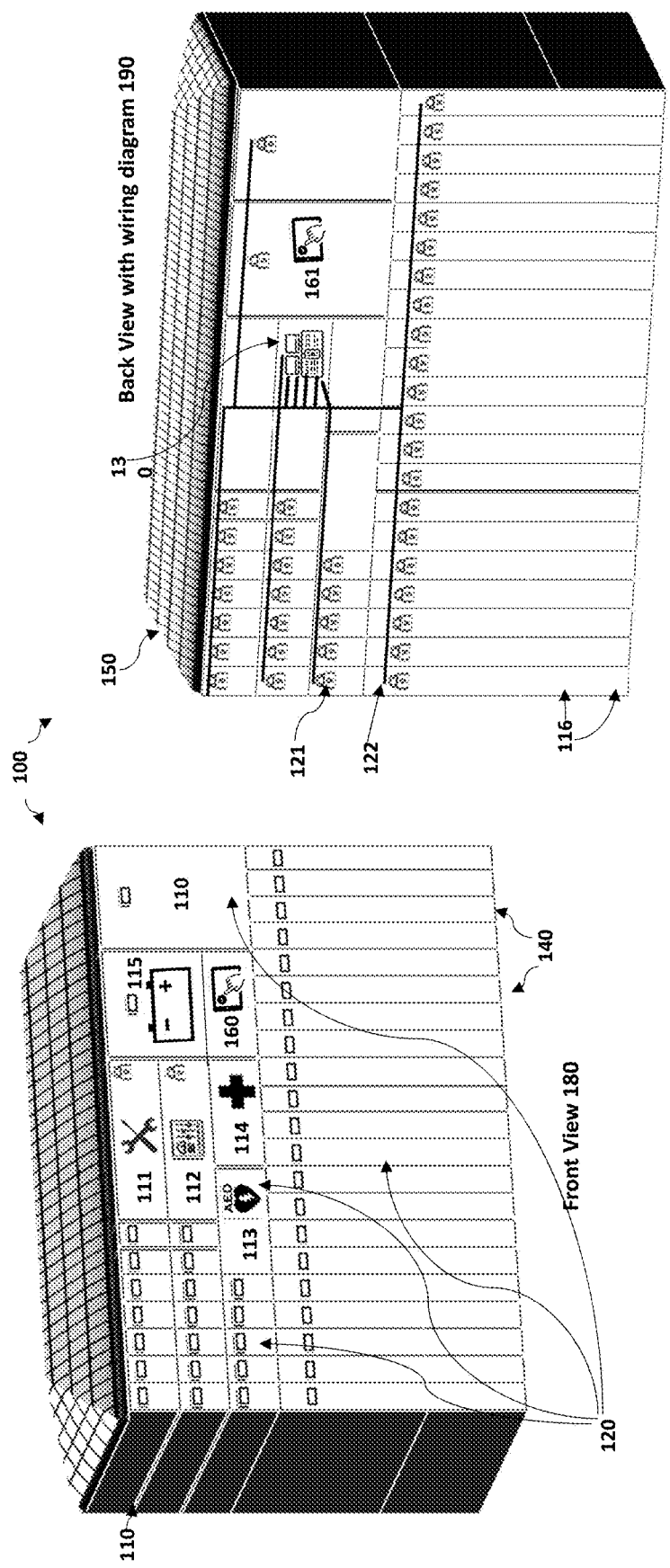

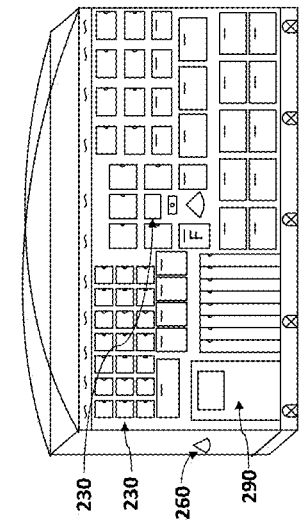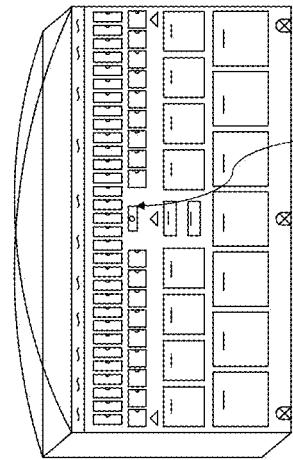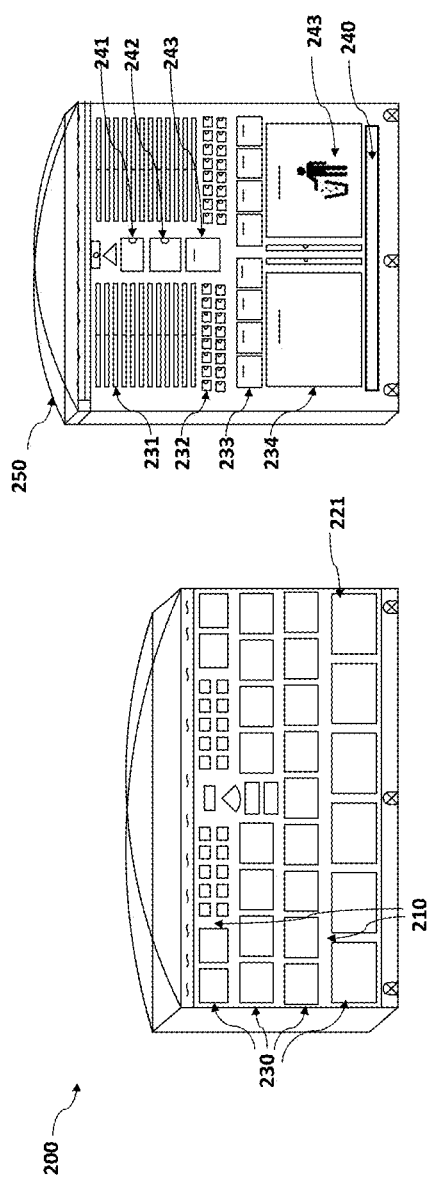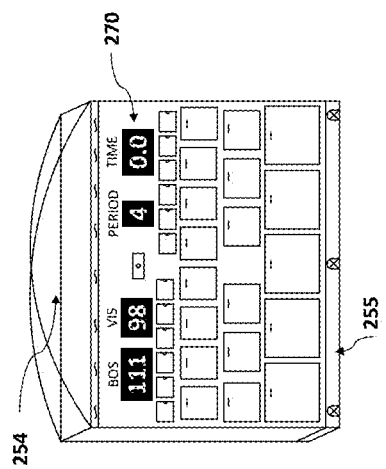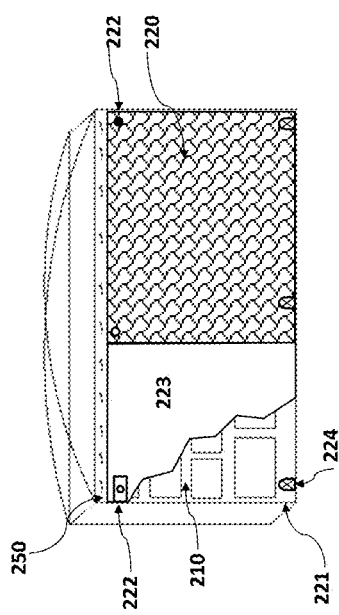

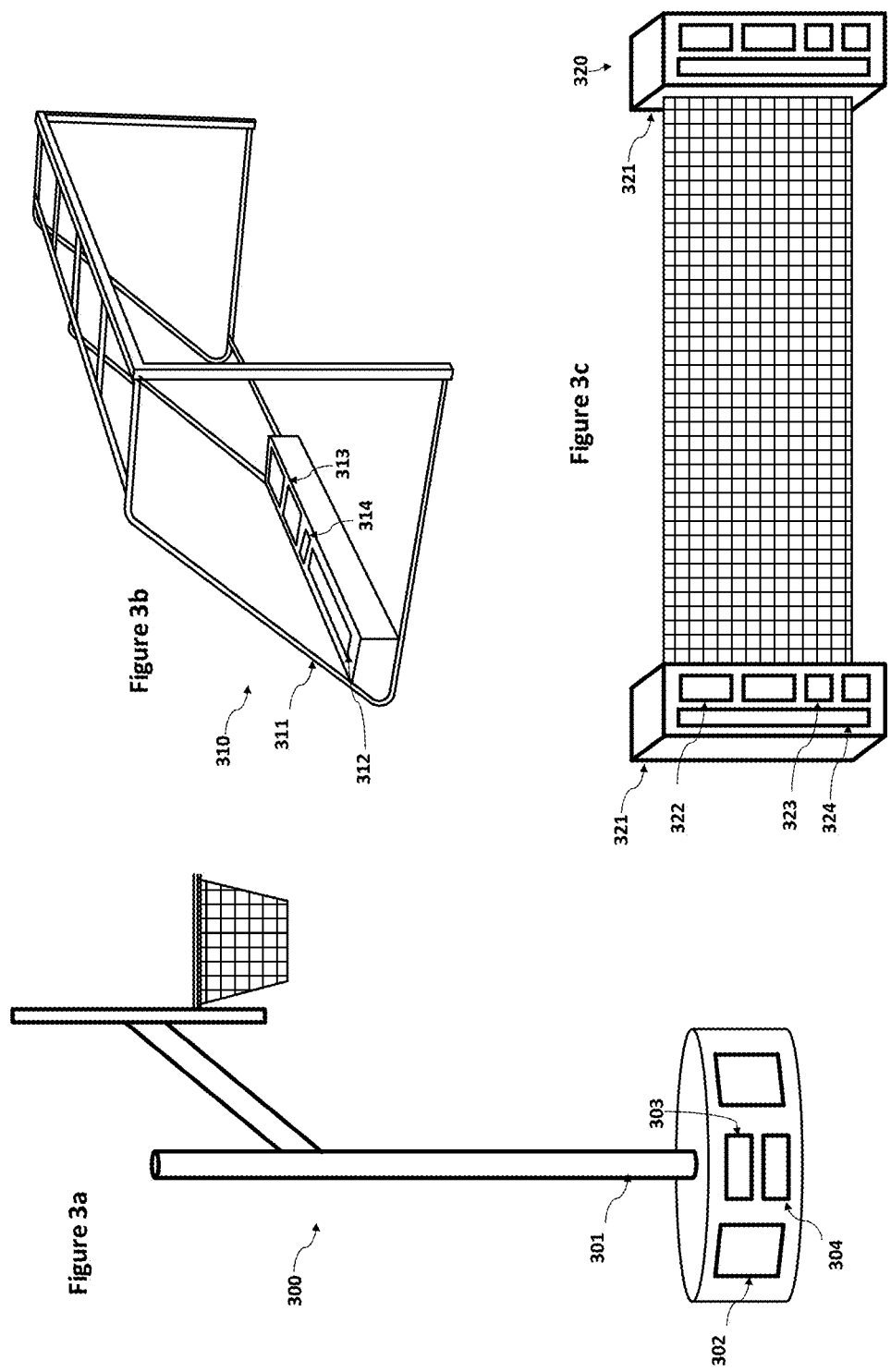

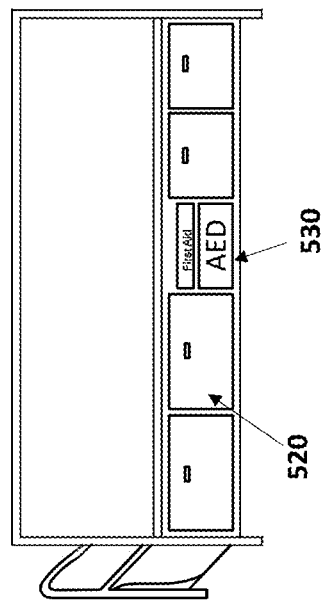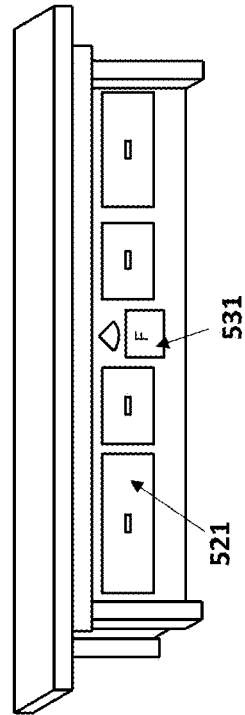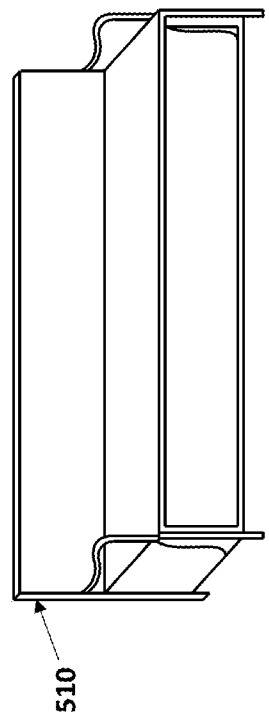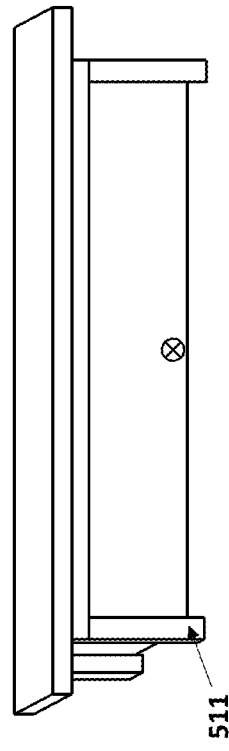
Figure. 5a
Figure 5b

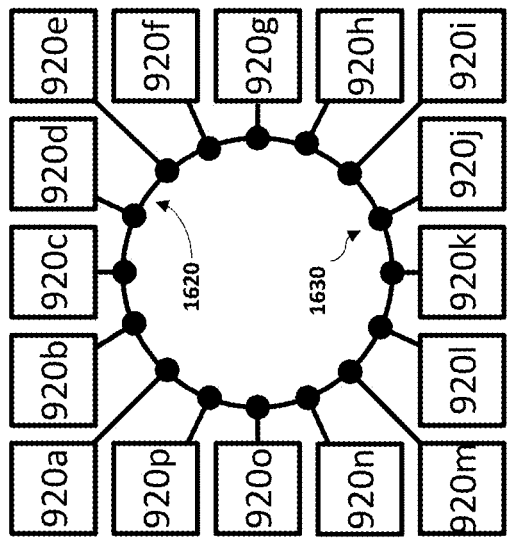
Figure 16
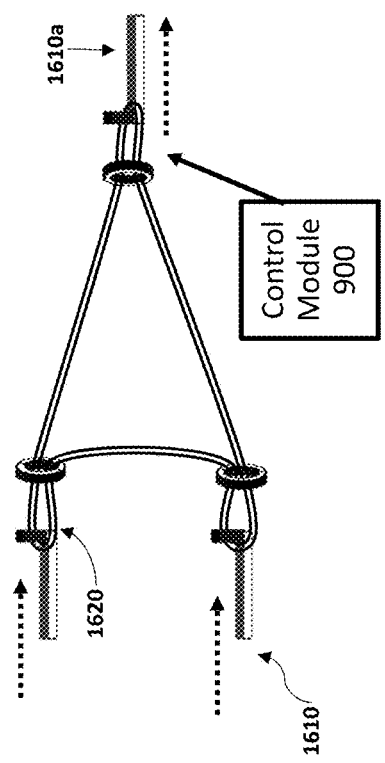
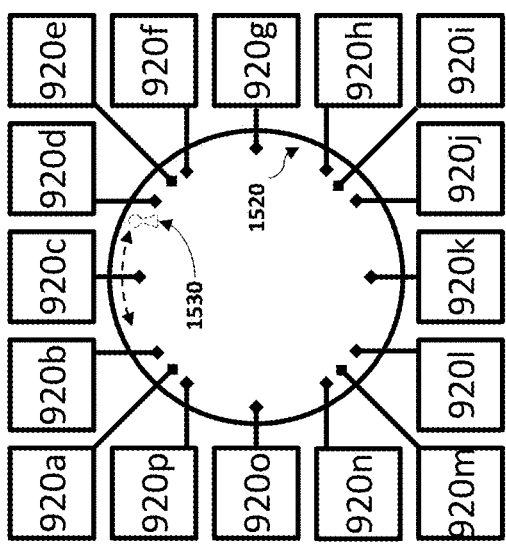
Figure 15
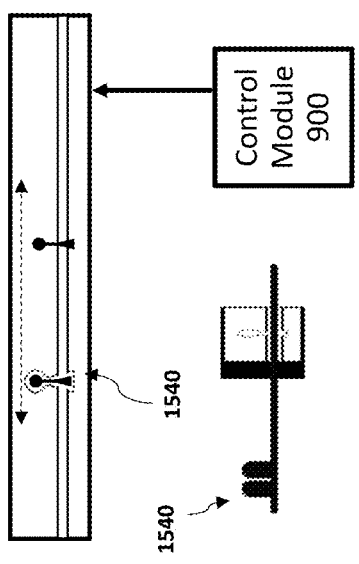

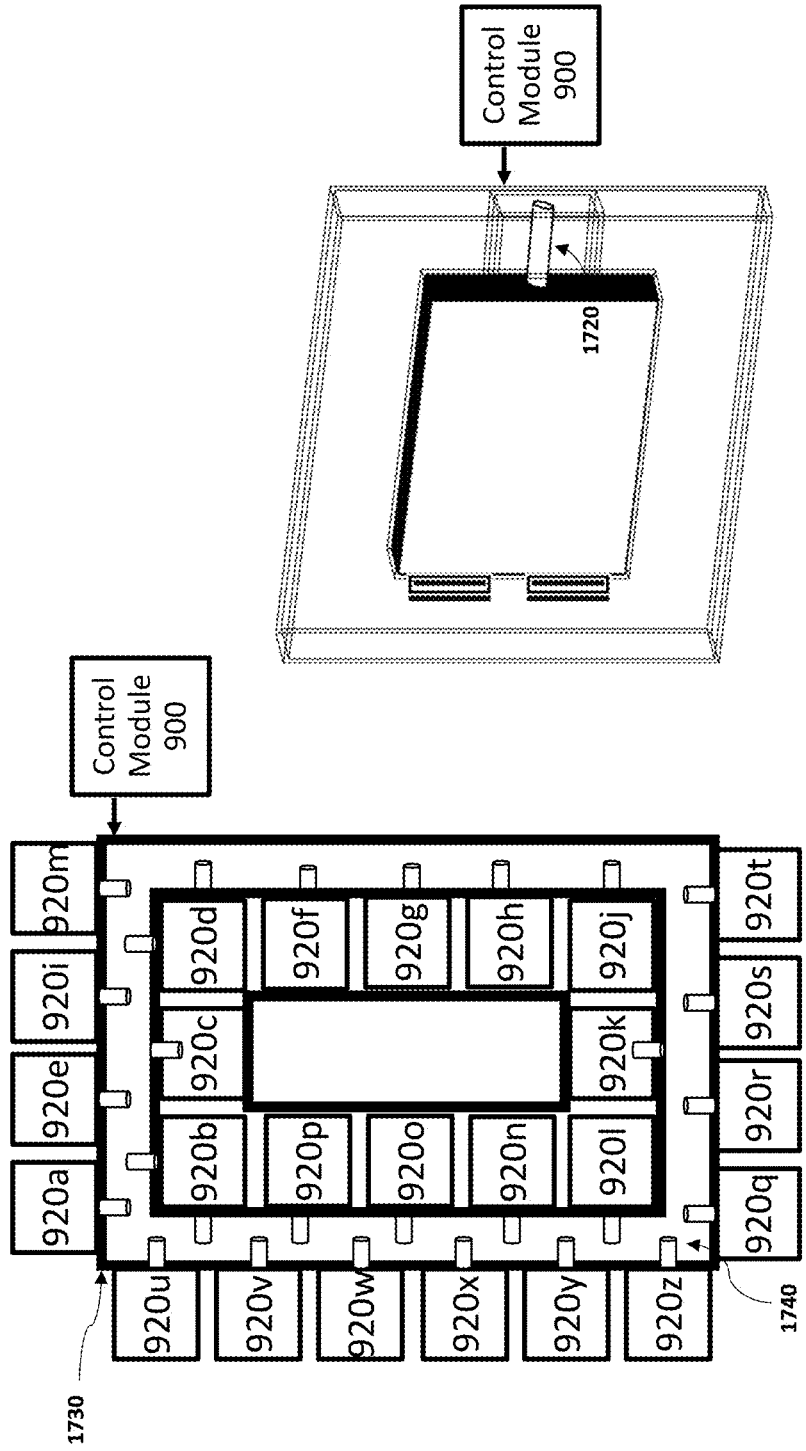

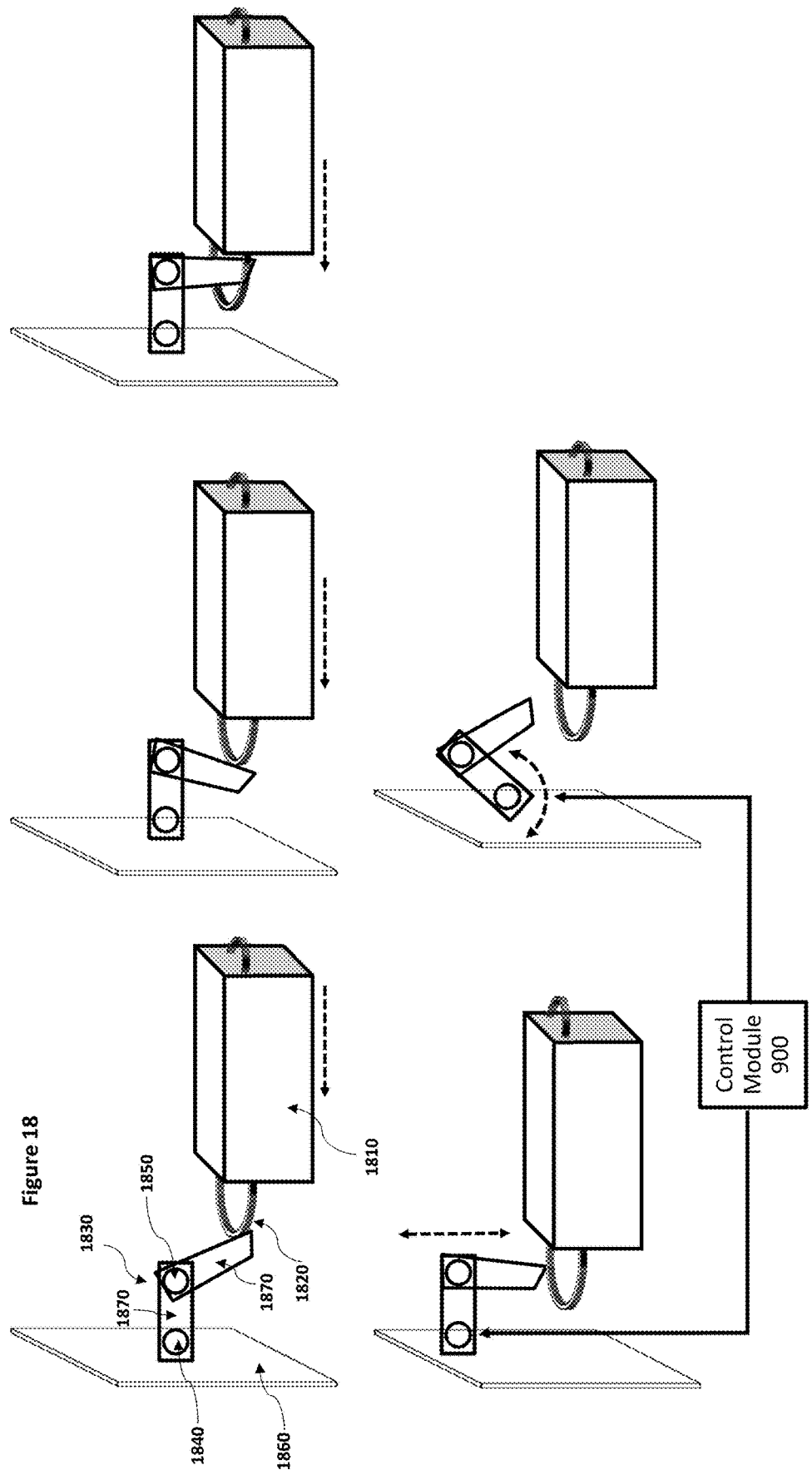

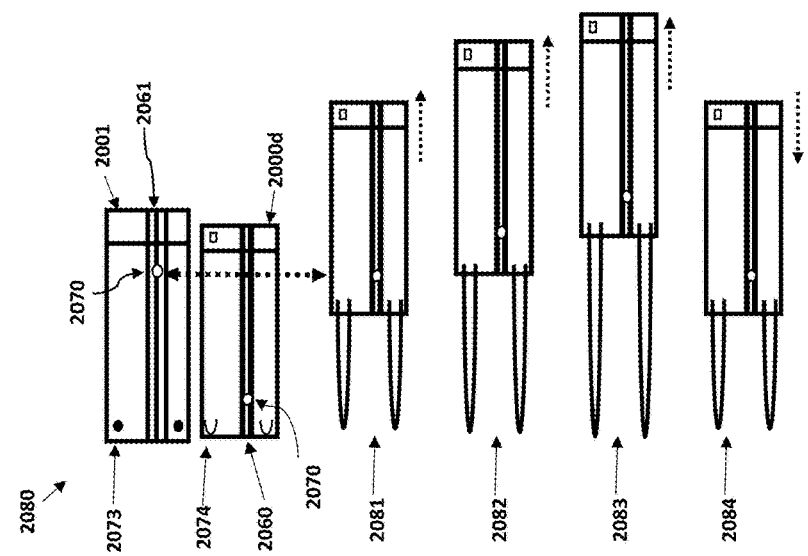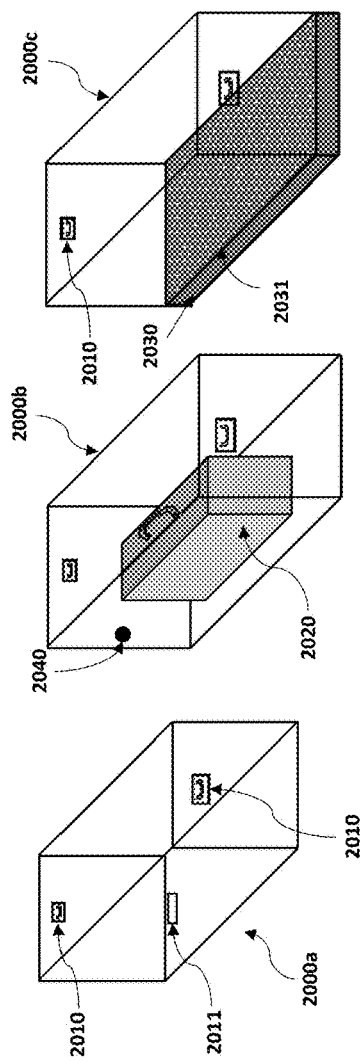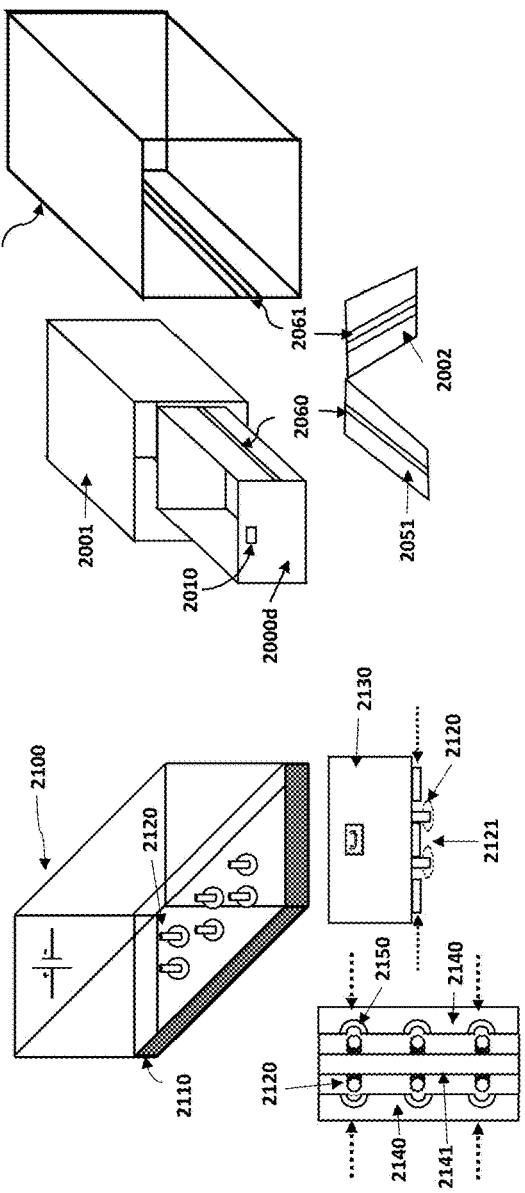

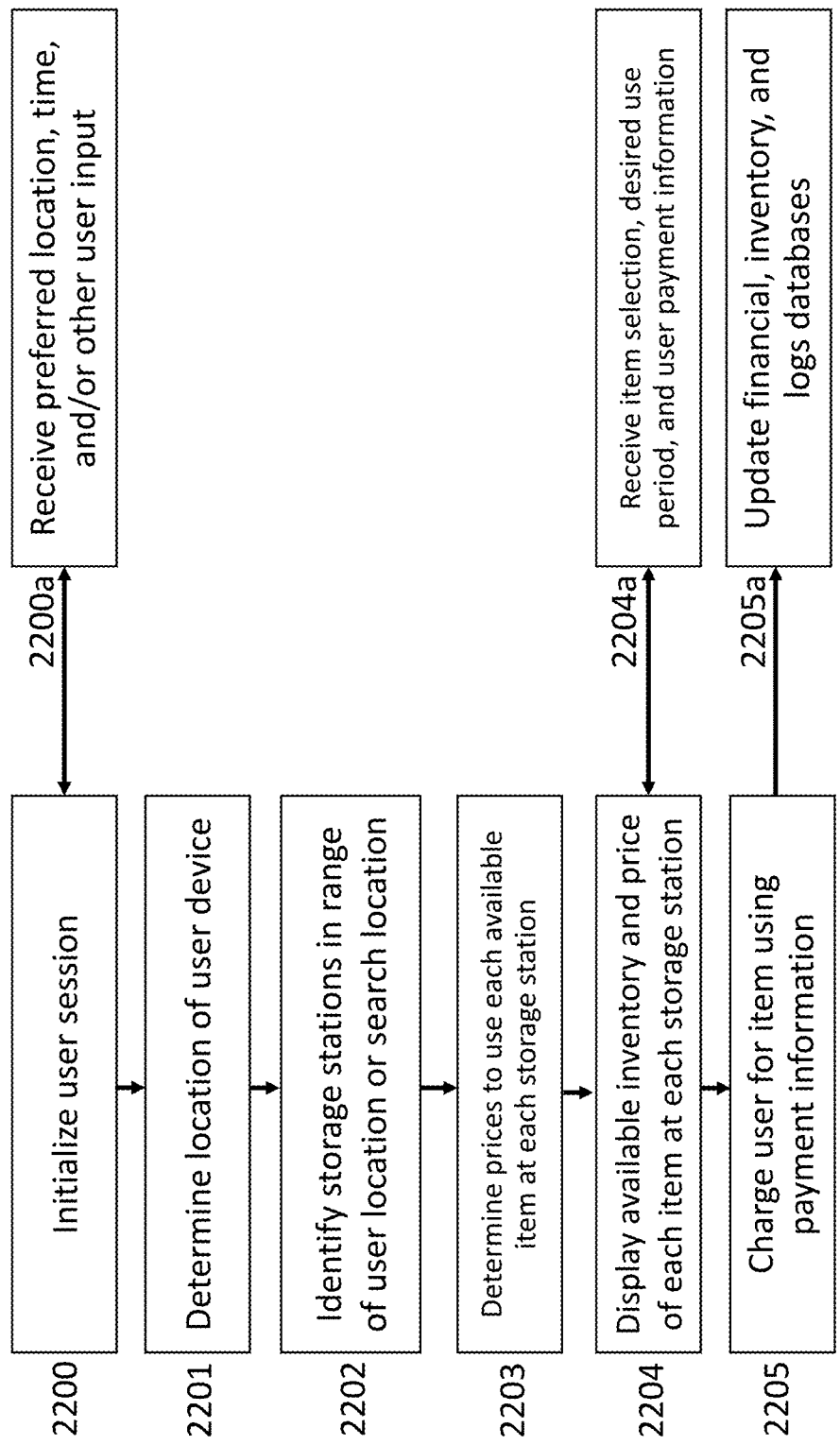

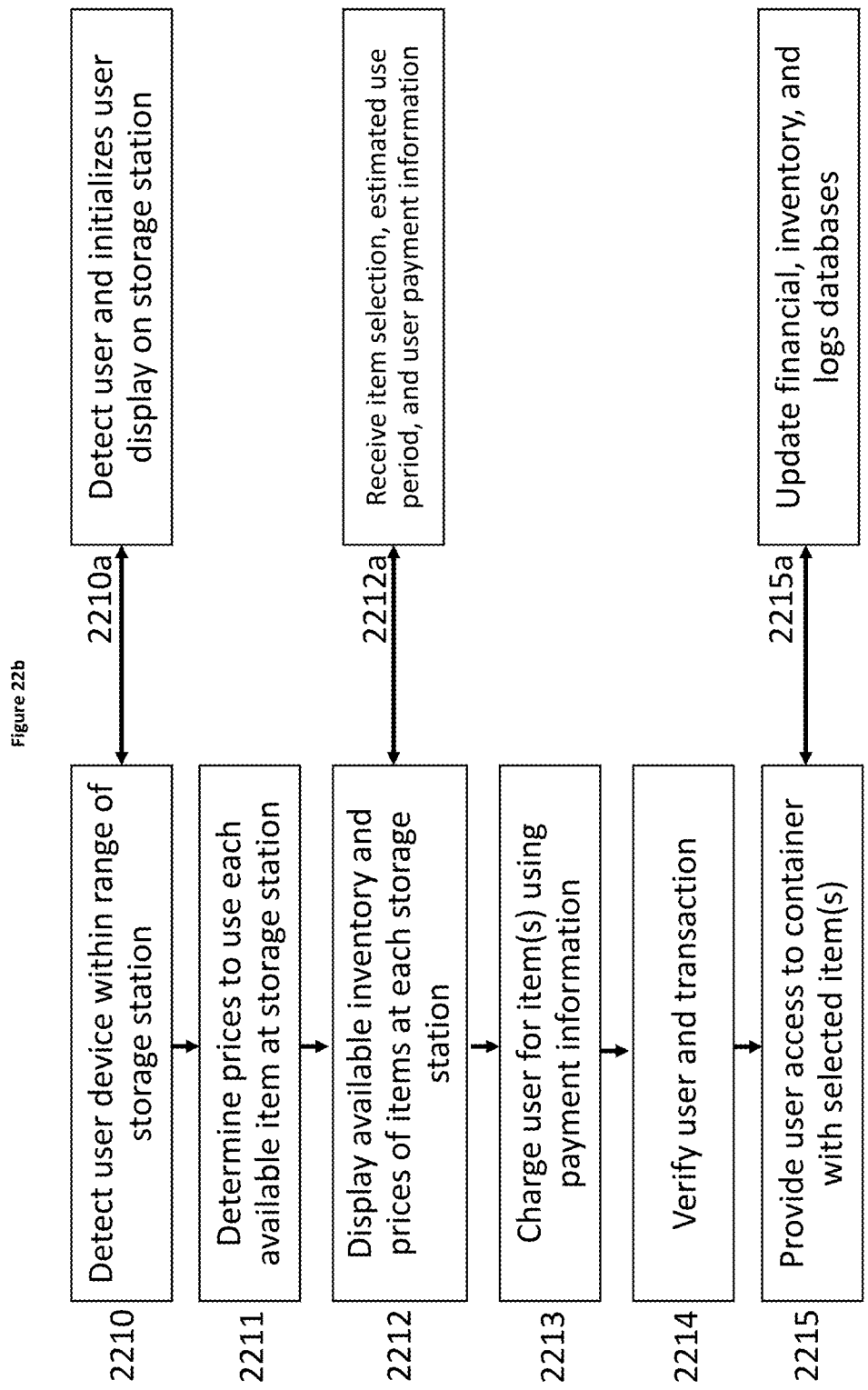

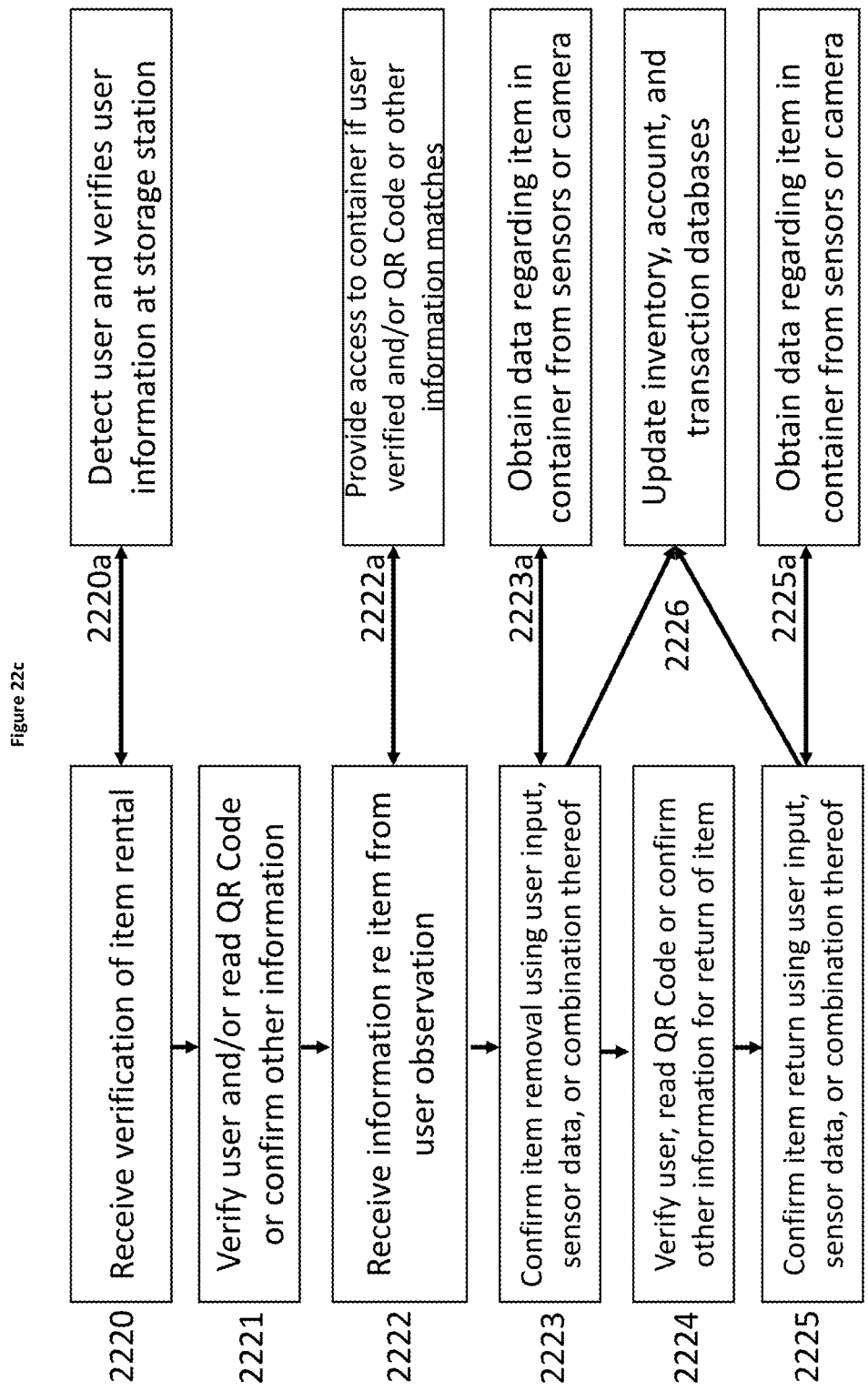

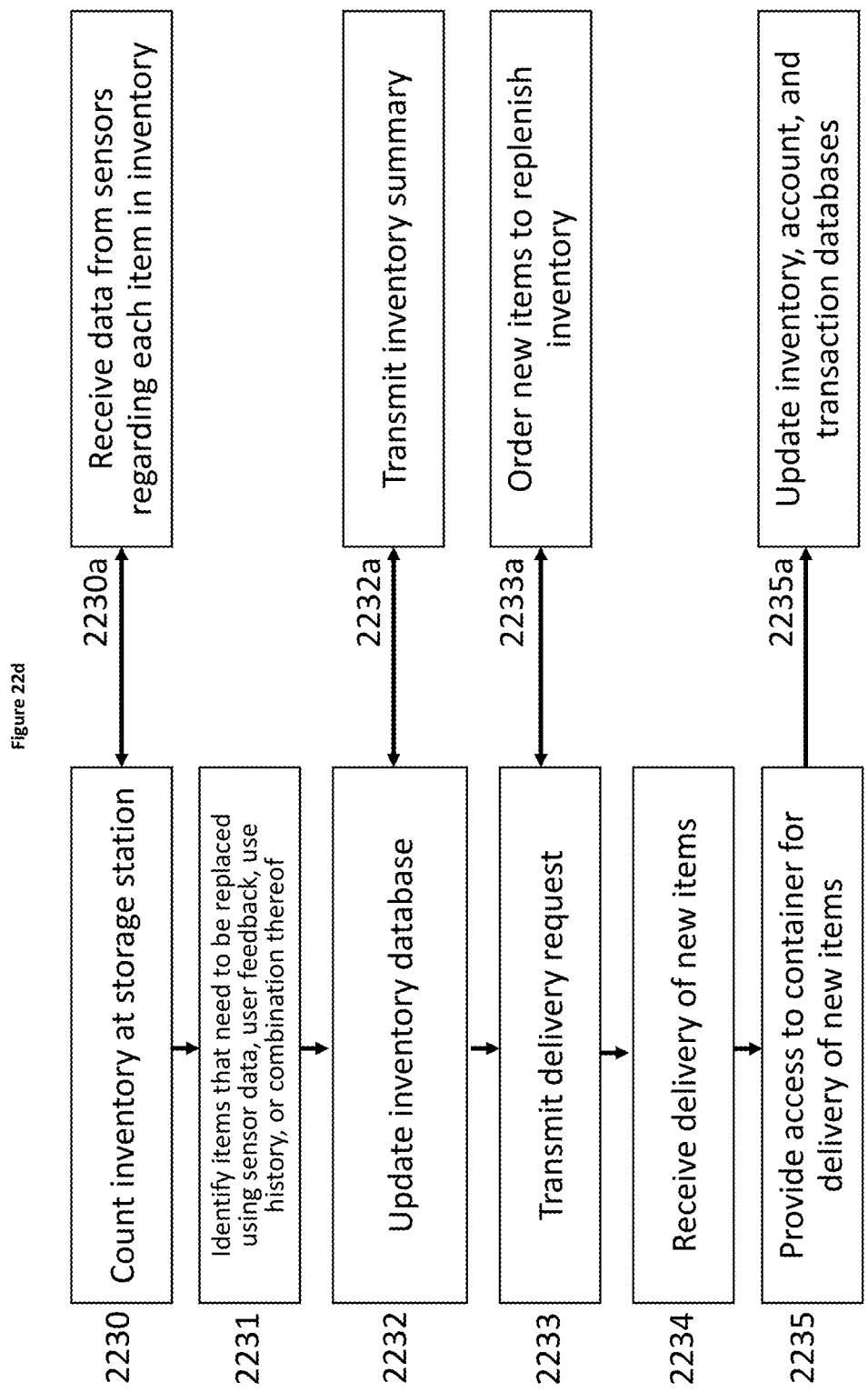

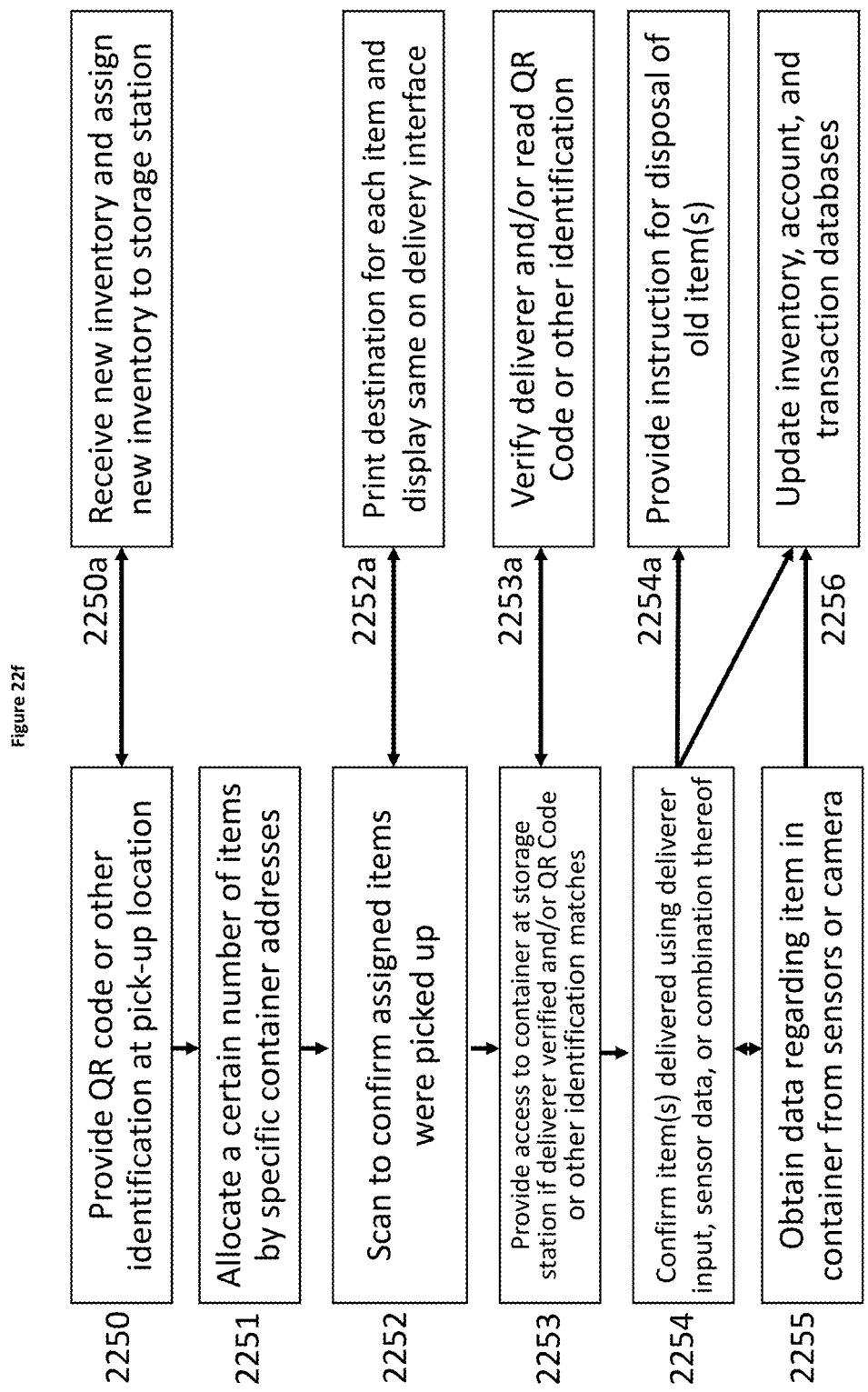

METHOD AND SYSTEM FOR MANAGING SHAREABLE STORAGE OF GOODS AMONG USERS IN A COMMUNITY

RELATED APPLICATIONS

Not applicable.

STATEMENT ON FEDERALLY-SPONSORED RESEARCH OR DEVELOPMENT

Not applicable.

REFERENCE TO SEQUENCE LISTING, A TABLE, OR A COMPUTER PROGRAM

Not applicable.

FIELD OF INVENTION

The present invention relates generally to public storage and management of sharable goods within a community of users.

BACKGROUND OF INVENTION

Some of the most valuable resources in any city or town are its public places, parks, and outdoor athletic areas. Regularly, it is impossible for a person to fully enjoy these places, and use them as they were intended to be used, without bringing a personal object from home which they use to activate and enjoy the space. Having to retrieve an object from home, carry it to a public space for use, and then return the object after it is done being used, is a very inefficient way engaging with public places and the items we use in those public spaces. People are so used to this routine that it is not generally perceived as an annoyance, yet our public places would be much more engaging if they provided the relevant items people need to enjoy them. Imagine if our baseball fields offered bats, balls and gloves on location, tennis courts offered rackets and balls on location, or a basketball court offered basketballs on location. This saves people the trip home to get the item they need, and the trip back home after they are done which can end up accounting for more time than they spent playing at the public space. If relevant items were offered at the locations they are intended to be used, it would be easier for people to exercise and play, more people would be involved with healthy, community-oriented, outdoor activities. This model would also reduce environmental costs of owning and transporting outdoor equipment.

There are a lot of outdoor, sports and play related objects that sit unused in people's homes and there are a lot public parks that are underutilized because, even though there are a lot of people nearby, those people do not have access to the items people use at those locations. To illustrate, in a high-rise apartment complex, there may be hundreds of basketballs, tennis rackets, footballs, and baseball mitts stored away in closets while at a public park nearby there are basketball courts, tennis courts, and fields that are not being utilized because people do not have easy access to the objects they need to play.

This paradigm wastes resources. Most goods are unused most of the time. Many goods are used only a few times. Too often, a desired good is not available at the right time and place. Reciprocally, our public places, baseball fields, football fields, tennis courts, are enjoyed less often than they should because it costs too much time and effort to play.

Currently, labor is needed to address this inefficiency. A gym, for example, may hire an attendant who maintains and manages an inventory of balls, rackets and other gym equipment for users to borrow or rent. But outside private athletic venues, like gyms or schools, this solution is cost-prohibitive. Without security measures, e.g., an honor system, where balls or other items are available at public places for anyone to take or leave, will rarely work over the long period of time and will likely never work in high population areas.

Although unmanned security measures such as lockers currently exist, there are many drawbacks to using them in public places. Having privately owned items housed on public parks runs counter to the park being public because such privately owned items would only be useful to the owner who rented locker space. Regardless of limitations on how public land should be used, most people would not want to pay for such a storage unit, and those that did would be limited to benefiting from the locations they rented lockers. Another drawback of unmanned lockers rented by individuals is that if in the unlikely event that they became popular the volume necessary at each public area might take up too much space to be feasible. Finally, the costs to maintain and manage them would be significant and the benefits minimal Public areas are often underutilized because, even though far more than a sufficient number of items exist to utilize these areas, the items are often unavailable where and when they are needed. This phenomena is seen with sporting areas like tennis courts, baseball fields, soccer fields, football fields, badminton courts and most other public athletic venues etc. In addition, there are also grassy fields without picnic blankets, snorkeling locations without snorkels, scenic views without binoculars, and camping areas without tents. The present invention addresses this problem and others.

SUMMARY OF INVENTION

Disclosed herein is a sharable storage system comprising one or more storage stations wherein the storage stations operably communicate with one or more user devices either directly or through a network. Each of the storage stations comprise a structure, one or more containers operably connected to the structure; and a processor operably connected to at least one of the one or more containers wherein the process has a control module that controls access to the at least one of the one or more containers. The storage station in the shareable storage system may be part of centralized network, a decentralized network, or a combination thereof.

The storage station may further comprise an interface operably connected to the processor wherein the interface is adapted to communicate with a user device wherein the interface receives input from a user wherein said input relates to a purchase or a temporarily use of an item held in the one or more container that is accessible through the control module. This disclosure further describes an embodiment of the storage station wherein the first container from the one or more containers stores a first item; wherein the second container from the one or more containers stores a second item; and wherein the interface creates a graphical user interface ("GUI") that is programmed to allow a user to select the first item or the second item; wherein the processor receives the selection; and wherein the processer provides access to the container holding the selected item through the control module.

The disclosure provides multiple embodiments of configurations of the control module operably connected to a plurality of containers wherein the control module provides access to each of the plurality of containers. It further describes embodiments of locks or securing mechanisms to secure a container where the control module is operably connected to such lock or securing mechanism of the container to provide access thereto.

The storage station may further comprise a power supply operatively connected to the storage station wherein the power supply is derived from solar energy, wind energy, hydro-energy, a battery, a generator, electricity from an electrical grid, or a combination thereof. The storage station may further comprise one or more databases on a computer-readable medium operably connected to the processor wherein the databases contain user data, inventory data, financial data, market data, logs, or a combination thereof.

In an exemplary embodiment, the storage station further comprises at least one sensor or peripheral operably connected to the processor wherein the sensor or peripheral obtain data relating to video, audio, temperature, humidity, luminosity, air pressure, heat, precipitation, acceleration, weight, motion, magnetic force, gestures, sounds, or a combination thereof and wherein said data may be processed to determine a security threat, verify user identities, take inventory, evaluate an item's condition, or manage the power supply.

The disclosure also teaches a storage station apparatus comprising a structure; one or more containers operably connected to the structure; an inner container operably connected to one or more containers wherein the inner container may be retracted from the container; and a processor operably connected to at least one container wherein the processor provides access to the container through a control module. This exemplary embodiment may further comprise at least one storage container wherein the storage container holds an item. In some embodiments, the storage container contains a sub-compartment that may contain a sensor, a peripheral, or an object used to protect an item's quality. The station may also further comprise at least one utility container wherein the utility container may contain a first aid kit, a control panel, a security gate, a cover, an an automatic electronic defibrillator, a battery, a trash receptacle, a parking meter, or a combination thereof.

It also discloses an embodiment of a storage station in proximity to a public area where the storage station comprises of one or more containers holding items wherein the items are characteristically used at the public area, including for example, wherein the public area is a tennis court and the item is a piece of tennis equipment. In other embodiments, the storage station, including the one or more containers therein, is designed and dimensioned to be adjacent to a pre-existing fixture in a public area, including for example, fixtures such as a basketball pole, tennis net poles, a baseball dugout, or a frame for a soccer net. In another embodiment, the storage station is configured so that it may be used as a sports bench or a park bench.

This disclosure also describes a process for calculating charges to purchase or temporarily use an item based upon the historical use of an item. This method may comprise the steps of establishing a replacement cost of an item; determining the amount of time in which the item may be used before being replaced; setting a temporal rate based on the replacement cost and the amount of time before being replaced for the first use; tracking the period of time an item is used; determining its condition; recalculating a price based upon the period of use, its condition, and the temporal rate for its second or subsequent use; or a combination thereof.

The disclosure also provides exemplary methods of the present invention, generally including processes for providing access of an item to a user, receiving input from a user to search the one or more items, pricing an item, receiving a selection of one or more items, receiving an order for purchase or temporary use of one or more items from a user; tracking inventory at one or more storage stations; maintaining inventory at one or more storage stations, replenishing inventory on a periodic basis and/or based on inventory data, obtaining new items, tracking deliveries of new items, ensuring quality control of items with data from sensors or peripherals, offering prize contests, and cultivating targeted advertising.

BRIEF DESCRIPTION OF THE DRAWINGS

FIG. 1 is an embodiment of the sharable storage station;

FIG. 2a depicts the front and back of an exemplary container arrangement of a shareable storage system;

FIGS. 2b-2e depict a variety of examples of containers configurations in exemplary storage stations;

FIGS. 3a-3c illustrate embodiments of storage stations designed and dimensioned to incorporate features of a public area, including a basketball court (3a), a soccer field (3b) and a tennis court (3c);

FIG. 5a depicts a storage station configured to be used as a park bench;

FIG. 5b depicts a storage station configured to be used as a sports bench;

FIG. 11 provides an exemplary non-centralized networking infrastructure;

FIG. 15 illustrates an exemplary of a locking mechanism;

FIG. 16 illustrates an exemplary of a locking mechanism;

FIG. 17 illustrates an exemplary of a locking mechanism;

FIG. 18 illustrates an exemplary of a locking mechanism;

FIG. 20 illustrates examples of a variety of containers and drawers;

FIG. 21 depicts an exemplary battery container; and

DETAILED DESCRIPTION

Figure 3D:
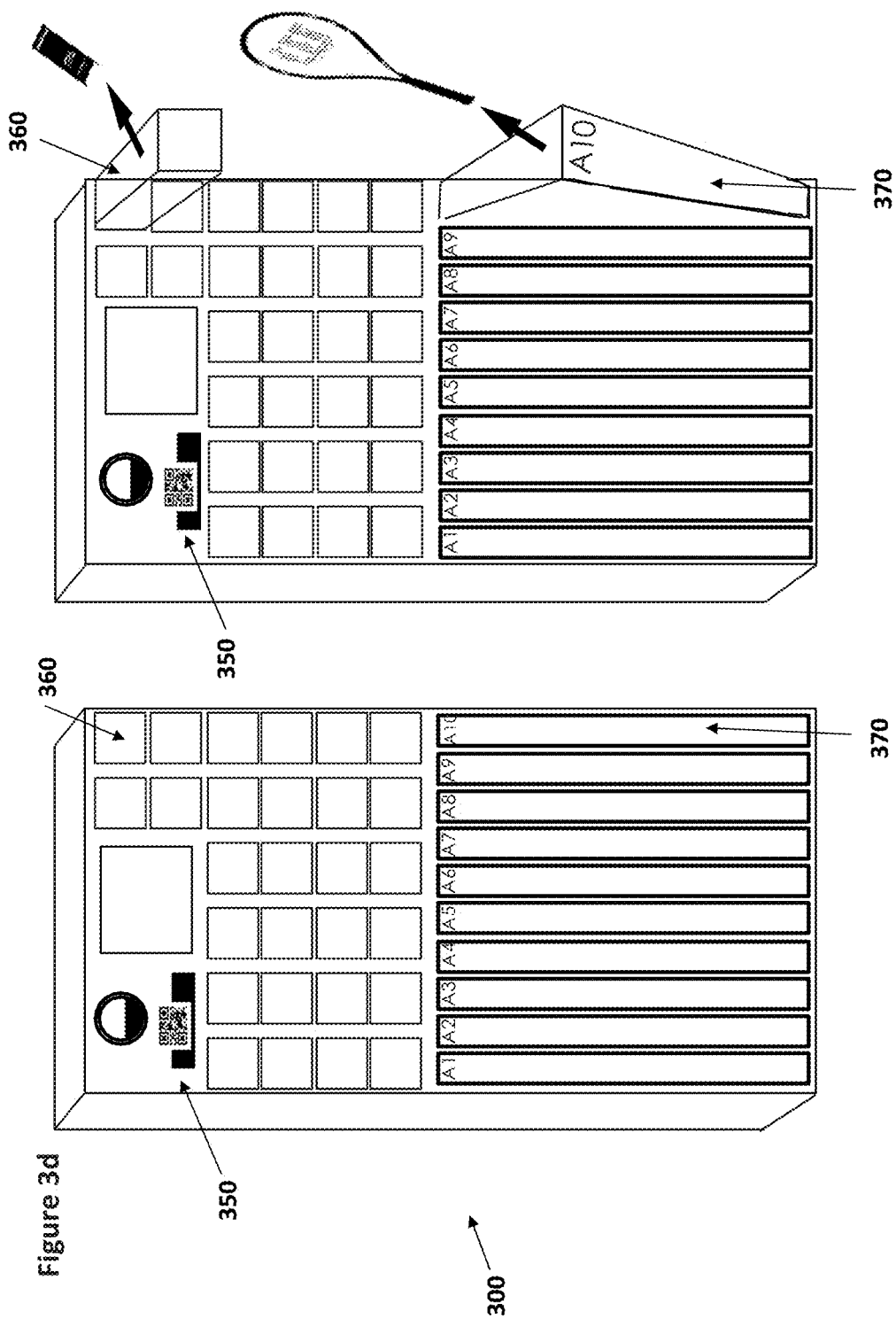
FIG. 3d illustrate another embodiment of a storage station with containers dimensioned to hold tennis equipment.

A description of an exemplary system, which incorporates embodiments of the present invention, is hereinafter described. Embodiments of the present invention facilitate the shared use of goods among a community of users, efficiently utilize resources in a community, and increase the community's use and enjoyment of public areas. Apparatuses and methods that improve the manner in which goods are delivered to and received by consumers are disclosed.

In one embodiment, a shareable storage station is disclosed that includes a plurality of storage stations each containing at least one or more containers and a processor in operative communication with at least one of the containers. In certain embodiments, the plurality of storage stations may be part of a network with a centralized server that allows a user device to communicate with the at least one of the plurality of storage stations. In another embodiment, the plurality of storage stations form a non-centralized network where the plurality of storage stations comprise of a first storage station and a second storage station that communicate with each other or a user device directly or through a network, e.g., a cellular network.

An exemplary embodiment of the present invention includes a storage station comprising of a structure, one or more containers operatively connected to the structure, and a processor operatively connected to at least one of the one or more containers. A container may be a utility container or a storage container. A storage container generally holds an item that an end user may purchase or acquire for his or her temporary use. Utility containers include those containers that are not storage containers. Utility containers generally serve a useful purpose, including for example, containers holding objects that serve the public area or those using it, e.g., a first aid kit, an automatic electronic defibrillator ("AED"), or a trash receptacle. A utility container may also have contents for maintaining operating of the storage station, e.g., a control panel, a battery, a security gate, etc. Both utility and storage of containers may be physically secured.

In an exemplary embodiment, the storage station is located in a public area where the storage station comprises of one or more containers that are designed and/or dimensioned to hold items that are characteristic of the public area. The items provide a community of users with more opportunities to use and enjoy the public area. For example, a storage station located at a baseball field may hold items like gloves, a baseball, bases, and baseball bats. The storage station, the containers, or both may be dimensioned and/or designed to hold items that are characteristic of the public area. Likewise, they may be dimensioned and/or designed to minimize the impact on the public area, including its aesthetics.

The storage station communicates with user devices (such as a smart phone, tablet, handheld device, etc.) directly or indirectly (e.g., via a network) preferably through a graphical user interface ("GUI") either on the user device or the storage station. Through the GUI, a user may, for example, find a nearby storage station, search the items at nearby storage stations, reserve an item for use, purchase an item, acquire an item from the storage station, and/or return an item to its container. There may be a plurality of GUIs where each GUI provides functionality for different user classes, e.g., end users or customers, delivery personnel, deliver drivers, and those responsible for managing or maintaining the storage station.

Containers in a storage station may be secured in multiple manners. A processor operably connected to one or more of the containers provides access through, e.g., a control module that may comprise of hardware, software, firmware, circuitry, magnetic devices, electrical signals, mechanical components, or a combination thereof. In general, a control module provides access to a container by operably communicating with the container or a lock (as defined herein) operably attached to the container. As illustrated below, the control module and the containers may be configured in myriad ways.

An exemplary storage station may include sensors, video cameras, audio recorders, or a combination thereof that obtain data that is analyzed to, for example, increase security, verify users, determine inventory, assure quality control, generate alerts, identify emergencies, and notify first responders. The storage station may have means to communicate, or alternatively include peripheral components that are configured to communicate, via an adopted technology standards, e.g., wireless (WIFI, Bluetooth, etc.), radio, HTTP, etc. Optionally, the storage station may employ a smart audio peripheral that records audio near or around the station and uses the recordings to identify events and/or movements in or around the station to manage its operation, e.g., sensing items, identifying maintenance issues (e.g., squeaky doors), ensuring security, or a combination thereof. To illustrate, a smart audio peripheral may listen for the closing of a container to confirm it was closed. The smart audio peripheries operably communicate through a processor in the storage station, a NB-IoT network, a WIFI network, or a combination thereof.

FIG. 1 illustrates an exemplary embodiment of a storage station 100 comprising a structure 110, a plurality of containers 120 operatively connected to the structure 110, one or more locks 121 operably connected to at least one of the plurality of containers 120, and a processor 130 that operably communicates with the at least one locks 121. In this embodiment, a wire 122 connects the processor 130 to each of the one or more locks 121.

A storage station 100 may have a front side 180 and a back side 190. Preferably, the front side 180 provides end user access while delivery personnel, delivery drivers, station managers, and maintenance people access the back side 190. Preferably, containers 120 are accessible from both the front side 180 and the back side 190. In a preferred embodiment, access to the containers 120 from the back side 190 may be gained mechanically. Each side may include a touchable GUI 160, 161 where preferably the GUI 160 on the front side 180 is programmed for end users and the GUI 161 on the back side 190 is programmed for delivery personnel, delivery drivers, station managers, maintenance people, or a combination thereof.

Containers 120 may be storage containers 116 or utility containers 111-115. A storage container 116 holds items that people acquire for personal use. A person generally returns an item to the storage container 116 after using the item. In a preferred embodiment, each storage container 116 is operatively connected to a lock 121 or other securing means. As discussed below, the processer 130 controls access to the containers 116 via a control module.

Utility containers 111-115 generally contain useful objects, including for example, functional components of a storage station 100, e.g., a control panel container 112 or a battery container 115. Utility containers may also hold tools and supplies for maintenance 111 of the storage station 100. A utility container may hold objects to serve the general public, including for example, a trash container 243 (FIG. 2), a first aid container 113 or an Automated Electronic Defibrillator ("AED") container 114. Because public areas are often used for physical activity, providing accessible first aid accoutrement will benefit people injured at the park. Likewise, accessible AEDs in these public areas would save lives because every minute matters when a person goes into cardiac arrest. Storage and utility containers are described in more detail below.

In an exemplary embodiment, a storage station 100 has a bottom member 140 and a top member 150. The bottom and top members 140, 150 may be part of, adjacent to, or fastened onto the structure 110. A bottom member 140 may have grounding legs that extend into ground.

Solar panels may be part of, adjacent to, or fastened onto the storage station 100, preferably the top member 150, to supply power to the storage station 100. It is preferable that the top member 150 be sufficiently angled or arched so that litter and other objects fall off it. Sufficient slope also decreases the likelihood that rain, snow, or other precipitation will accumulate and damage the storage station 100. The top member 150 may contain part or all of a utility container, including for example, a control panel container 115.

FIG. 2 further details exemplary storage stations 200 that each comprise of a structure 210 and one or more containers 230 operatively connected to the storage structure 200. The exterior surface of a storage station 200 may be formed by the structure 210, the one or more containers 230, an outer wall 223, a bottom member 254 (FIG. 2d), a top member 255 (FIG. 2d), or a combination thereof. For example, in FIG. 2a-1, the front exterior side 211 of the storage station 200 has an exterior surface comprising portions of the structure 210 and the storage containers 230. In FIG. 2a-2, the back portion of the storage station 200 has an exterior surface comprising of an outer wall 223 adjacent to the structure 210. In certain embodiments, the exterior surface may include a member of a second structure or portions thereof. See FIG. 5.

A storage station 200 may include security gates 220 to prevent theft and vandalism. For example, sliding security gates 220 may secure the storage station 200 when it is unavailable. In FIG. 2a, for example, a storage station 200 may have a retractable gate 220 that is secured with locks and/or latches 222, 224 and is generally coplanar to the back side 221 of the structure 210. In this embodiment, the retractable gates 220 slide horizontally. Alternatively, gates may slide vertically, e.g., open and close from a top member 250 or a bottom member 255. The gates 220 may retract in other ways, including folding or with hinges. The gates 220 may retract into a designated space, e.g., a utility container 240 (FIG. 2b).

A utility container 240 may alternatively hold a cover. Preferably, a cover comprises of a first layer made of a knife resistant fabric like Cut-Tex Pro and a second layer comprised of a water proof fabric. The outer edge of the cover may have a drawstring that can be tightened around the base of the storage system and then secured into place to prevent removal.

The storage station may also contain fixed gates to protect areas that are not secured by the sliding gate 220. To protect against the elements and improve aesthetics, gates may be located behind an outer wall 223. The gates 220 may be retracted manually, automatically, or in response to user input, including for example, through a GUI.

A storage station 200 may also have a QR reader 260, an audio recorder, a video recorder 280, or a combination thereof. A storage station 200 may contain a variety of sensors, including for example, sensors for temperature, humidity, motion, weight, acceleration, impact detection, water detection, light, an open/closed sensor, or a combination thereof. Optionally, the storage station 200 may have useful functionality for public areas, e.g., a scoreboard 270 or a parking meter 290.

Storage containers 231-234 may take different shapes. For example, storage containers 230 may be rectangular prisms (illustrated in FIG. 2), polygonal prisms, pyramids, cones, cylinders, partial spheres, or any three-dimensional shape that creates a cavity to hold an item. Storage containers 230 may also have varying sizes. The sizes may be random or based upon standard box sizes or maximum dimensions that are known in the carrier industry, e.g., the U.S. Post Office's maximum dimensions and standard packaging, FedEx boxes, UPS boxes, etc.

Alternatively, storage containers 230 may have dimensions based upon particular items. In an exemplary embodiment, the storage containers 230 are designed and dimensioned to hold items that are commonly used at a public area. A public area is an area open to the public for use, including for example, public parks, grill areas, basketball courts, dog parks, baseball fields, beaches, hiking trails, rest areas, soccer fields, golf courses, tennis courts, train stations, etc. Public areas also include privately-owned areas that are open to the public (e.g., stores, concert venues, etc.) or areas regularly visited by many people (e.g., condos, apartment complexes, country clubs). Public areas may be indoors or outdoors.

FIG. 3d illustrates a storage station 300 designed to be located at a tennis court. The containers are dimensioned to hold tennis balls, tennis rackets, or other tennis equipment. The storage container 360 for tennis balls and the storage container 370 for tennis racquet opens when a QR code on a user device is read by the QR reader 350.

Besides variations in shape and size, storage containers 230 may also be refrigerated, heated, climate-controlled, provide electricity, contain sensors or other components that provide security, protects against theft, ensure quality, manage inventory, or operate a network of storage stations 100. As discussed below, a container may be attached or adjacent to a sub-container that may be used to hold temporary accessories to protect the contents of a container, e.g. dehumidifier packets, insect repellent, etc.

Figure 8A:
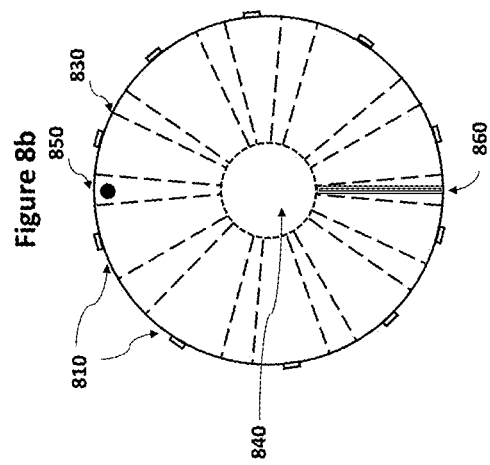
FIGS. 8a and 8b depict a front view and top view of an exemplary housing container.
Figure 7A:
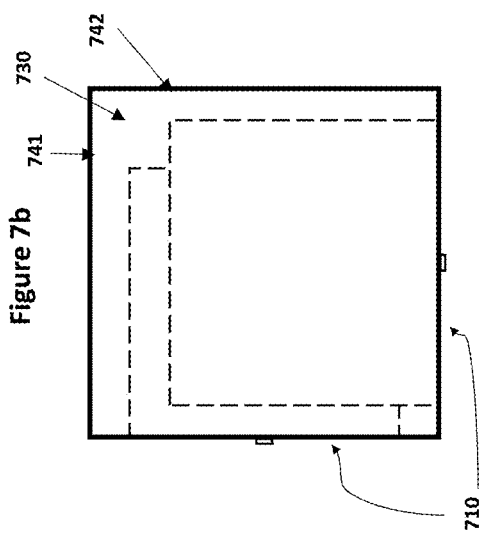
FIGS. 7a and 7b depict a front view and top view of an exemplary housing container.

FIGS. 2-8 illustrate exemplary dimensions and arrangements of a storage stations and the containers therein. FIGS. 2 and 3 illustrate exemplary embodiments of storage stations with containers having dimensions derived from the characteristics of a public area and its associated uses. For example, a baseball diamond is a common public area that is used for baseball, softball, etc. The dimensions of a storage station and the containers therein for a baseball diamond would be, for example, derived from the size necessary to store baseball bats, baseballs, softballs, bases, and other items needed to play baseball or softball games. To minimize its aesthetic impact, FIGS. 3a-3c, 4 and 5 show exemplary embodiments where the storage station's dimensions are derived from a public area's existing characteristics. For example, it is common for baseball diamonds to have a bench or dugout. A storage station may be dimensioned to replace the bench or contained within a dugout. FIG. 5 provides exemplary embodiments of a storage station designed to replace benches in a public area, including park benches and sports benches. In this example, the storage station's structure and dimensions may derive from the existing bench and it would be composed of appropriate materials for this use (e.g., sufficiently strong for people to sit on it). FIGS. 6-8 illustrate examples of storage stations with different shapes.

FIG. 2 provides examples of storage stations 200 that are designed to be located in a public area (e.g., a park, a beach, a basketball court, etc.) comprising of one or more storage containers 230 where at least one of said one or more storage containers 230 are designed and dimensioned to hold one or more items that are commonly used at the public area. The storage station 200 provides people a convenient way to obtain items to use and enjoy these public areas. More specifically FIG. 2a depicts containers 230 to hold basketball items, including for example: basketballs (bottom row), small basketballs, accoutrement for other games played on basketball courts, e.g., dodgeballs, wiffleball sets, etc. (middle rows), and ball pumps, basketball nets (top row).

The dimensions of these storage containers 230 are be based upon the dimensions of the item that it will hold. For example, a basketball has a diameter of approximately 9.5 inches. A storage container for a basketball may be 10"×10"×10" for one ball. It may be 20"×10"×10" to fit two balls. The bottom of a container 230 may have a cavity formed to fit with an item. In general, the volume of a storage container 230 will be or 5-20% greater than the item being held times a factor if the container 230 is dimensioned to fit more than one of said item.

It should be apparent that the desired items may vary from locality to locality even if the public area is the same. As a result, the dimensions of storage containers 230 may vary depending on the locality though certain items will likely be constant, e.g., storage stations 230 at basketball courts will have containers for basketballs.

FIG. 2b shows an arrangement of a plurality of storage containers 230 where each of the containers 230 is operably connected to a storage station 200 that will be located near or at a tennis court. More specifically, the storage containers 230 are designed to hold tennis-related items, including for example, tennis rackets 231, tennis balls 232, tennis nets 233, and a ball hopper 234. The storage station embodied in this figure also depicts utility containers 241-244, including a gate container 240 and a trash container 244. FIG. 3d provides an alternative embodiment of a storage station 300 with storage containers 360, 370 designed to be used near or at a tennis court.

FIG. 2c shows an arrangement of storage containers 230 operably connected to a storage station 200 designed to be used near or at a beach. The storage containers 230 are dimensioned to hold beach-related items, including for example: beach towels, beach games, sun umbrellas, life preservers, boogie boards, suntan lotion, and the like. Because parking near beaches is often managed with parking meters, the storage station 200 may include a parking meter container 290.

FIG. 2d shows an arrangement of storage containers 230 operably connected to a storage station 200 designed to be used near or at a soccer field. Optionally, a storage station 200 for a soccer field may include a scoreboard 270.

FIG. 2e shows an arrangement of storage containers 230 for a storage station 200 designed to be used near or at a baseball field. In this embodiment, the storage station 200 also contains a video camera 280 that may be used for security. The video camera 280 may also be used to record game play. In one embodiment, the camera 280 is used to record and process real-time video of game play that is used as input for an automated referee.

It is understood that the storage containers 230, utility containers 240, and the components in the exemplary storage stations 200 may be arranged in myriad ways. These examples in no way limit the scope of the potential arrangements in a storage station 200. It is also understood that a storage station 200, including the storage containers 230 therein, may be adapted for other purposes beyond these examples. For example, the storage station 200 may be used as node in a delivery system. In a storage station used for delivery system, equally-sized storage containers 230 may be desirable.

FIGS. 3a-3c depict exemplary embodiments that minimize the visual impact that the storage stations have on a given public area. The exemplary storage stations 300, 310, 320 are adjacent to or attached to common fixtures found in certain public areas, including for example, neighborhood parks: a pole for a basketball hoop 301, a frame for a soccer net 311, and two poles to hold a tennis net 321.

To minimize their visual impact, these storage stations 300, 310, 320 only have storage containers to hold items that are essential to make use of the public area. Although not shown in the figures, utility containers for a control panel, first aid kit, and AED may also be deemed essential. Because it is desirable to ensure that necessary items to use the public area are available, replacement items may also be deemed essential.

In FIG. 3a, the storage station 300 contains only four storage containers 302-304 which is sufficient to hold the essential items needed to use and enjoy a full length basketball court: two basketballs (for two half court games), a replacement net, and a basketball pump. The replacement items raises the number of essential items to eight: four basketballs, two nets, and two pumps (one pump can be used by two groups). If each item had its own storage container, eight storage containers would be necessary. In some embodiments, a storage container may hold a plurality of the same item, e.g., multiple basketballs in a single storage container 302.

In terms of fitting into a public area, the size of the storage station is generally more important than the number of containers. The essential volume of these containers—the volume required of a container to hold the respective essential item(s) therein—is preferably minimized. As a general guideline, the essential volume for a storage container 302-304 is at most 120% of the volume of the essential item(s) that the storage container will hold. The volume of an item is measured with or without its original packaging.

Turning back to the example in FIG. 3a, the volume of the essential items (four basketballs, two nets, and two pumps) is approximately 600 cubic inches. The essential volume of the storage containers 302-304 to hold these items is thus 5%-20% more than 600 cubic inches or 630 to 720 cubic inches. The essential volume of the utility containers is preferably about 500 cubic inches for a first aid kit container, about 500 cubic inches for an AED container, and about 300 cubic inches for a control panel container. Because the storage station 300 will need space for other components (e.g., structure, locks, walls) the essential volume of the storage station 300 may be up to 20% more than the essential volume of total volume of the storage and utility containers. In this example, the containers have an essential volume between 1930 and 2020 cubic inches which would limit the storage station 300 to a volume between 2315 and 2425 cubic inches. The storage station 300 still must be dimensioned to fit each container 302-304.

FIG. 3b depicts an exemplary storage station 310 with storage containers for the items essential to use and enjoy a soccer field. The essential items are a soccer net, two soccer balls, and a ball pump. The exemplary storage station 310 is adjacent or attached to the soccer net frame 311 and it has storage containers 312-314 only for these essential items.

FIG. 3b depicts an exemplary storage station 320 with storage containers for the items essential to use and enjoy a tennis court. The essential items are tennis rackets, tennis balls, and a tennis net. The exemplary storage stations 320 are adjacent or attached to the tennis net poles 321 and they have storage containers 322-324 only for the essential items. An alternative to two storage stations 320 in this example would be a single storage station 320 opposite a regular net pole where the single storage station 320 has storage containers 322-324 for the essential items.

Figure 4:
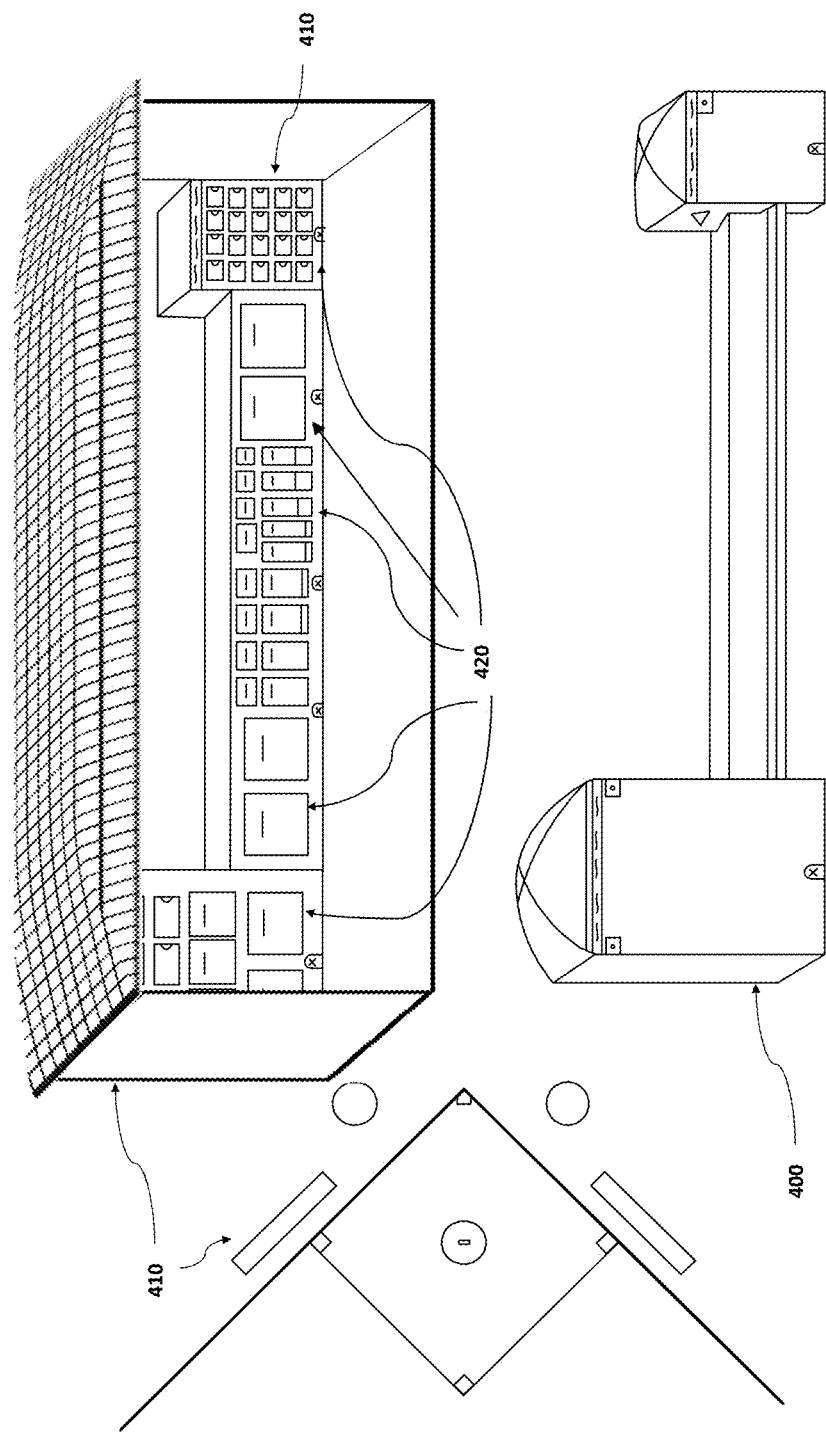
FIG. 4 illustrates an exemplary embodiment of a housing container configured for a baseball dugout.

FIG. 4 illustrates an embodiment of a storage station 400 that is adjacent to or contained within a baseball dugout 410. Because a baseball dugout has space for an entire baseball team, this embodiment has more space for storage containers 420. As a result, the design of this storage station 400 presents less concern regarding size.

FIG. 5 illustrates examples of storage stations 500, 501 that are integrated with a bench 510, 511. These embodiments minimize the storage stations 500, 501 impact on the public area while also offering storage stations 500, 501 that may be used for general purposes in a variety of locations. In the park bench embodiment (FIG. 5a), storage containers 520 and utility containers 530 are located underneath the sitting portion of the bench 511. Similarly, in the sports bench embodiment (FIG. 5b), the storage containers 521 and utility containers 531 are located underneath the sitting portion of a sports bench. In a preferred embodiment, a plurality of storage stations 500 that are integrated with a bench are located in a public area, including for example, large public parks, wherein a first storage station of the plurality of storage stations 500 is adapted to communicate with a second storage station. This communication is advantageous because it allows the plurality of storage stations 500 to make available a larger variety of items to users because the first storage station may direct a user to the second storage station for different items. Advantageously, if each bench in the plurality of benches are uniform, including the storage containers 520 therein, a user may pick up an item at the first storage station and return it to the second storage station.

Figure 6A:
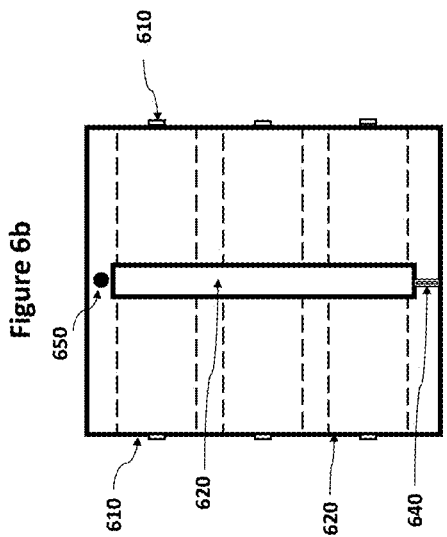
FIGS. 6a and 6b depict a front view and top view of an exemplary housing container.
Figure 6B:
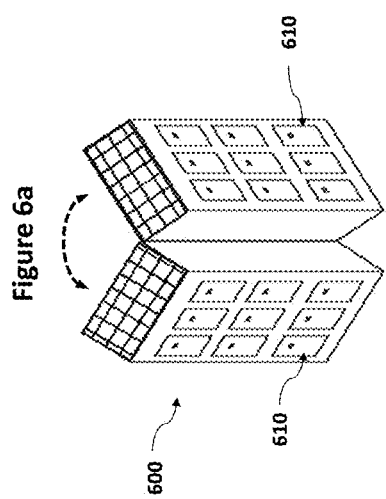

FIGS. 6-8 depict examples of the shapes and configurations that storage stations may take. FIG. 6 illustrates a storage station 600 shaped as a rectangular prism where the front of the storage containers 610 are located on opposite sides. In a preferred embodiment, the structure 620 forms an aperture 630 that may be used for the control panel or other components of the storage station 600. Optionally, the storage station 600 may contain a rotatable joint 650 on a first side and a latch 640 on the opposite side that may allow the storage station 600 to be opened as illustrated in FIG. 6a which advantageously provides access to any components in the aperture 630. FIG. 6b provides a top view of the storage station 600.

Figure 7B:
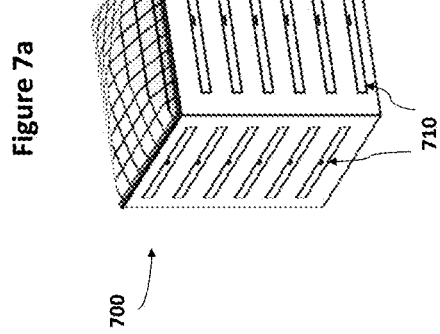

FIG. 7 shows an exemplary storage station 700 shaped as a rectangular prism where the front of the storage containers 710 are located on adjacent sides. The containers 710 are arranged in an overlapping manner. In a preferred embodiment, the structure 720 forms an aperture 730 with a first wall 741 and a second wall 742 that may be used for the control panel or other functional components of the storage station 700. In a preferred embodiment, the first wall 741 or the second wall 742 of the storage station 700 contain a removable portion that provides access to any components in the aperture 730. FIG. 7b provides a top view of the storage station 700.

Figure 8B:
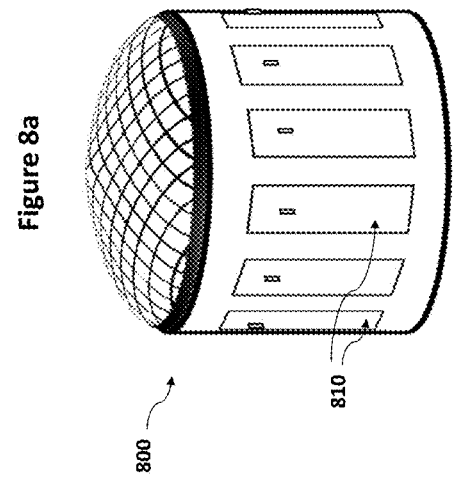

FIG. 8 shows an exemplary storage station 800 shaped as a cylinder where the front of the storage containers 810 are located on the perimeter of the cylinder wall 820. The storage containers 810 preferably take a triangular or trapezoidal shape to fit within the structure 830. In a preferred embodiment, the structure 830 forms an aperture 840 that may be used for the control panel or other components of the storage station 800. Optionally, the storage station 800 may contain a rotatable joint 850 on a first side and a latch 860 on the opposite side that allows the storage station 800 to be opened to advantageously provide access to any components in the aperture 840. FIG. 8b provides a top view of the storage station 800.

Figure 9A:
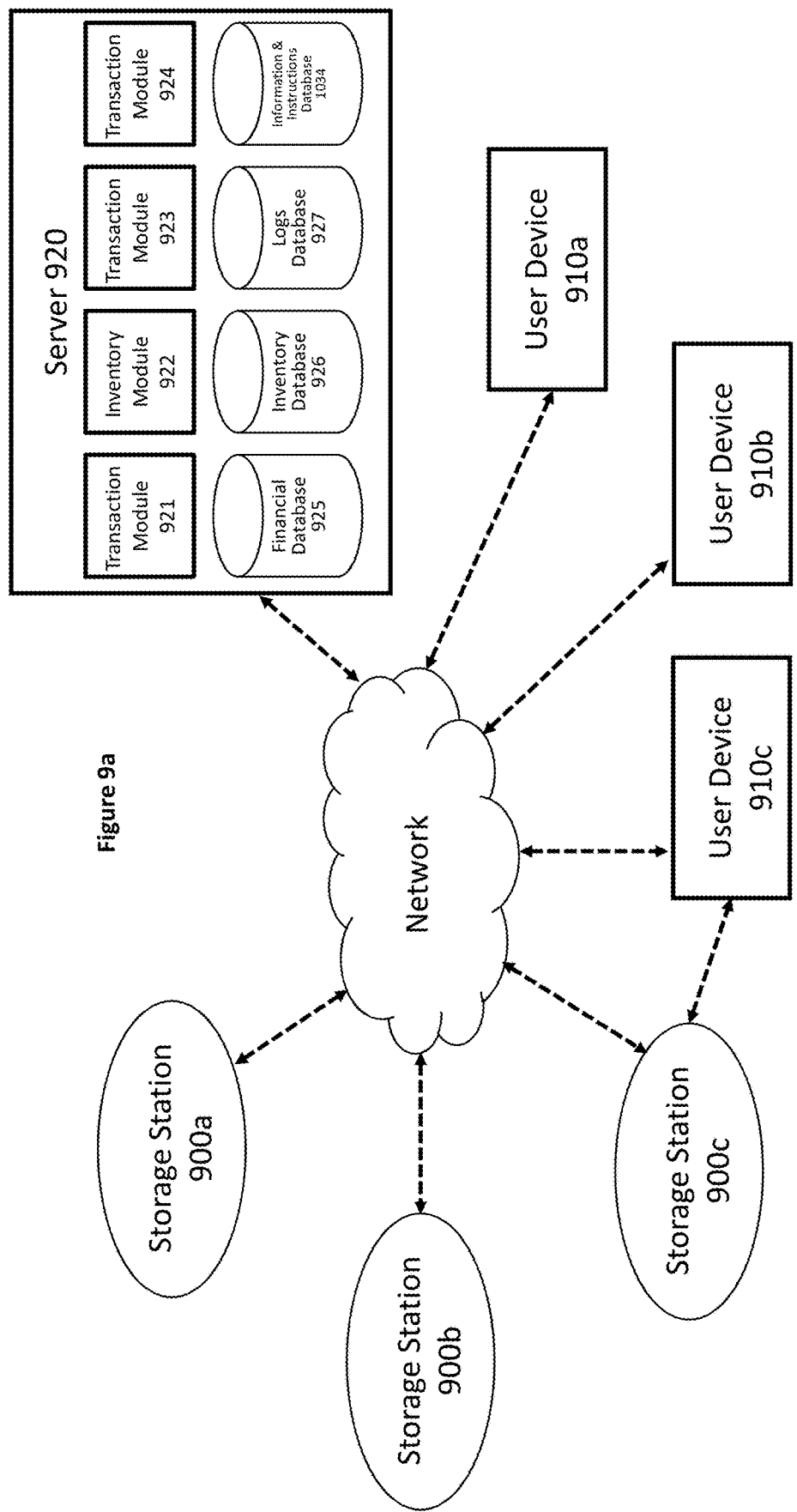
FIG. 9 is a schematic diagram of the components or modules that may be found in an exemplary embodiment.

FIG. 9a provides an exemplary block diagram of a centralized networking infrastructure comprising a server 920 and one or more storage stations 900a-900n where the server 920 and the one or more storage stations 900a-900n communicate over network, including for example, a local area network (LAN), a wireless local area network (WLAN), a campus area network (MAN), a metropolitan area network (MAN), or a wide area network (WAN), the Internet, or a combination thereof. The server 920 and the one or more storage stations 900a-900n communicate with each over the network through one more standardized networking protocols, including for example, the Transmission Control Protocol/Internet Protocol (TCP/IP), the User Datagram Protocol (UDP), Hypertext Transfer Protocol Secure (HTTPS), the Secure File Transfer Protocol (SFTP), Network Time Protocol (NTP), Secure Copy Protocol (SCP), Secure Shell (SSH), and other network protocols known in the art. One skilled in the art would recognize that other means for data communication may also be employed, including cellular networks and a public switched telephone network ("PSTN"). In an exemplary embodiment, user devices 910 can communicate with the server 920 via a network or with a storage station 900 directly via Bluetooth or WIFI®. The advantages of a centralized network configuration is, for example, that it eliminates redundancies, facilitates the ability to coordinate among the storage station 920, and decreases the computing resources needed in the storage stations 900.

In an exemplary embodiment, the server 920 maintains and manages certain databases that are accessible by all storage stations 900a-900n. For example, the server may maintain a financial database 925 that contains data obtained from or relating to users (name, address, telephone, date of birth, user name, password, device, order history, device information including MAC address, location data, user preferences, biometric data, etc.) and the financial data (e.g., sales, revenues, costs, pricing, etc.) relating to the storage station 900. Similarly, it may also have an inventory database that maintains detailed information on what products are in each storage station (e.g., item number, ASIN, item, description, category, size, weight, cost, purchase date, uses, unique uses, time used, rating, reviews, storage status, storage location, etc.). The inventory database would also have aggregate data on multiple storage stations 900. The logs database 926 maintains detailed information relating to activity at each storage station 900, including reservations, cancellations, deliveries, user transactions, discarded items, non-returned items, lost items, returned items, reviews, ratings, securing or locking a container, releasing or unlocking containers, purchases, any exchange of currency, alarms, warnings, period sensor data readings, turning on or off the storage station, entering or exiting sleep mode, maintenance work, and any other event or occurrence that relates to the operation of the storage station 900, any component therein, or any communication with a user device or other third-party device. Finally, the server 900 may contain an Information & Instructions Database 928 that contains data and information regarding each storage station 900a-900n, including for example location, status, inventory, data obtained at the storage station, and instructions for their operation wherein said instructions may be in the form of object code, source code, files, data streams, applications, software updates, executable programs, or in any other desired format.

Figure 9B:
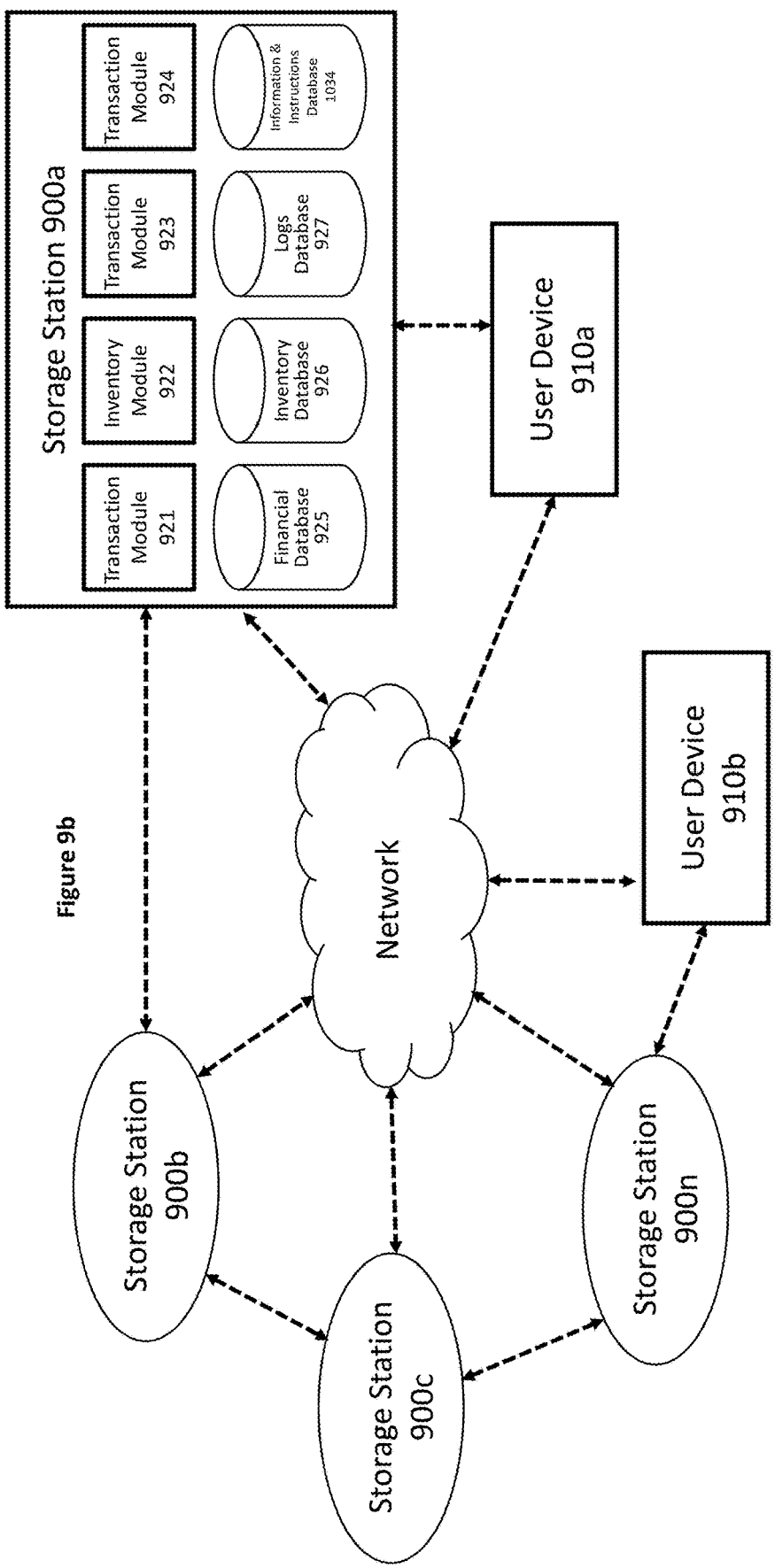

FIG. 9b provides an exemplary non-centralized networking infrastructure. The exemplary network shown therein comprises of a plurality of storage stations 900a-900n where the plurality of storage stations 900a-900n comprises a first storage station 900a and a second storage station 900b operably communicating with each other either directly or through a network. The main advantages of a non-centralized networking infrastructure is that each storage station 900 can run independently, it costs less in terms of computer hardware, and the communication between and among the storage stations 900 is generally faster. To obtain the benefits of the networks depicted in FIGS. 9a, 9b, a network of a plurality of storage stations 900 may comprise a subnetwork of a first plurality of storage stations 900 that are centrally configured and a second plurality of storage stations 900 that are decentralized.

Figure 10:
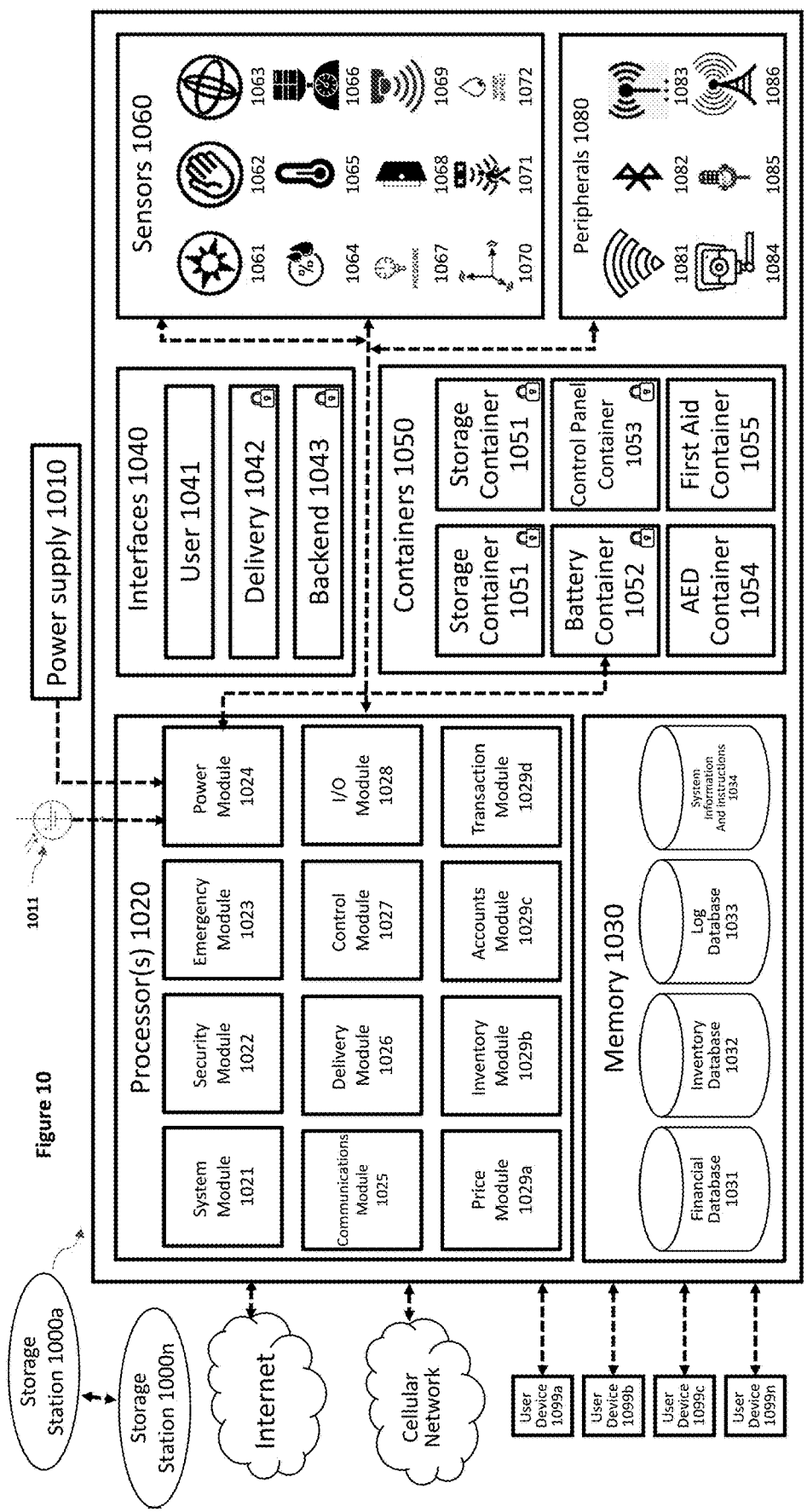
FIG. 10 provides an exemplary centralized networking infrastructure.

FIG. 10 is a schematic of an exemplary embodiment of the invention. One skilled in the art would appreciate that the invention may be implemented in myriad ways and the schematic does not serve to limit its scope nor constrain the manner in which the functionality represented in the processors, memory, modules, interfaces, sensors, and peripherals is implemented.

The storage station 1000 can include a power supply 1010, a computer architecture comprising of one or more data processors, specialty processors including for example image processors, general purpose processors (collectively, a processor 1020), memory 1030, interfaces 1040, sensors 1080, containers 1040, and peripheral components 1090 that can interface with each other, directly or indirectly, can be separate components, or can be integrated into one or more integrated circuits. The processor 1020 is operably connected to one or more containers 1050, where each of said containers 1050 is either a storage container 1051 or a utility containers 1052-1055. As detailed more below, the control module 1027 provides access to storage containers 1051. The various components in the device, for example, can be coupled by one or more communication buses or signal lines.

The storage station 1000 can have a plurality of sensors 1060 be coupled to the processors 1020 for data processing. These sensors may include, for example: a magnetometer 1061, a gesture sensor 1062, a gyroscope 1063, a humidity sensor 1064, a thermometer 1065, weight scales 1066 (generally to weigh items contained within a storage container 1051), a pressure gauge 1067 (generally to measure pressure within a storage container 1051), an open/closed sensor 1068 (senses whether a container 1050 is ajar), a light sensor 1069, an accelerometer 1071, a motion sensor 1071, and a water detector 1072 (generally contained within a storage container 1051). These sensors 1060 serve multiple purposes, including, user verification, power management, security, quality control, quality assurance, loss prevention, and inventory management. Advantageously, data from a plurality of different sensors 1060 may be used to identify an event occurrence using independent data which increases accuracy and reduces false positives.

To illustrate, the motion sensor 1071 and gesture sensor 1062 can provide data to verify a user's presence. Likewise, the motion sensor 1071 and light sensor 1069 can provide data that can be processed to determine the absence of any potential users which can be used to facilitate power usage—i.e., invoking a sleep mode if no person is in the near vicinity.

Sensors 1060 and/or peripherals 1080 may be held in a container 1050 or a sub-compartment thereof. A sensor 1060 or peripheral 1080 in a container 1050 can obtain container-specific data to evaluate, for example, whether an item has been removed and/or returned. For example, this determination may be determined by collecting images or sounds from the peripherals, data from the magnetometer 1061 to detect the difference in the magnetic force between the storage container 1051 with the item and without it (traces of ferrous material may be applied to an item to magnify this difference), a weight scale 1066 that weighs the contents of a storage container 1051, a pressure gauge 1067 that measures the pressure of a storage container 1051 (or alternatively the pressure in an enclosed flexible bag underneath the storage container 1051), and an open/closed sensor 1068 to sense whether the storage container 1051 is or was recently ajar. The gyroscope 1063, open/closed sensor 1068 that senses whether a storage container 1051 is ajar), the accelerometer 1071, and the motion sensor 1071 can provide data that indicates a security breach. The water detector 1072 and a scale 1066 that measures the weight of the structure or the total weight of each of the containers 1050 can provide data that can be used to evaluate whether water has penetrated the storage station 1000 so they may be removed promptly. Likewise, the humidity sensor 1064 and the thermometer 1065 may indicate that items must be removed from a storage container 1051 to avoid being ruined by extreme weather conditions. The motion sensor 1071, gyroscope 1063, accelerometer 1071, and scale 1066 can provide data that indicates wildlife is or is, for example, attempting to tip over the storage station 1000 or building a nest in the storage station 1000. Inventory can also be checked daily by using images, videos, data from the magnetometer 1061, scales 1066 (to weigh items in storage containers 1051 and/or the entire storage station 1000), the pressure gauge 1067 (to measure the pressure in each storage container 1051 or the pressure of a sealed bag located under each storage container 1051 or the storage station 1000), the open/closed sensor 1068 and the light sensor 1069 (e.g., where an item placed in a container 1051 in a position where it is between a light source and the light sensor 1069), or any combination thereof.

The data from the sensors 1060 can also be processed along with the data obtained from the video camera 1084 and audio recorder 1085 to verify users, ensure security, control quality, prevent loss, and manage inventory. For example, an audio recording can audio data to verify whether wildlife may cause damage to the storage station 1000, containers 1050 therein, or items in said containers 1050. Images and video recordings 1084 can confirm a security breach. Audio recordings 1085 can be employed to recognize voices to verify users.

The communications module 1025 generally interfaces with external devices to process external communications. The communications module 1025 functions can be facilitated through one or more wireless periphery components 1081-83, 1086, include for example, RF receivers and transmitters and/or optical (e.g., infrared) receivers and transmitters. The communication module 1025 can facilitate communication over multiple networks including for example, GSM, GPRS, EDGE, Wi-Fi or WiMax, Bluetooth, and a NB-IoT network. The communications module 1025 can also include hosting protocols such that the storage station 1000 can be configured to act as a transceiver or Internet hot spot for other storage stations and/or user devices 1099a-1099n.

The I/O module 1028 can process data from sensors 1060, peripherals 1080, an interface 1040, containers 1050, and any other sources(s) of data or information, including but not limited to storage stations 1000a-1999n and user devices 1099a-1099n. In an alternative embodiment, the storage station 1000 may provide a backend or delivery interface 1040 with a touch-screen option. Other input controller(s) can be coupled to the processors 1020, such as one or more buttons, rocker switches, thumb-wheel, infrared port, USB port, and/or a pointer device such as a stylus. The one or more buttons (not shown) can include an up/down button for volume control of a speaker (not shown) and/or microphone 1085.

The I/O module processes data from sensors and periphery devices and then transmits it to another module or an output device depending on the relevant instructions. In some implementations, the storage station 1000 can present audio and video files, such as MP3, AAC, and MPEG. The storage station 1000 can include the functionality of a smartphone. The storage station 1000 can thus include a pin connector that is compatible with the iPhone or other smartphone. Other input/output and control devices can also be used.

Memory 1030 can include high-speed random access memory and/or non-volatile memory, such as one or more magnetic disk storage devices, one or more optical storage devices, and/or flash memory (e.g., NAND, NOR). Memory 1030 can store an operating system, such as Darwin, RTXC, LINUX, UNIX, OS X, WINDOWS, or an embedded operating system such as VxWorks. An operating system may include instructions for handling basic system services and for performing hardware dependent tasks. In some implementations, an operating system can include a kernel (e.g., UNIX kernel).

Memory 1030 may also store instructions 1034 to facilitate communicating with additional devices, computers and/or servers. Memory 1030 can also include instructions for a graphical user interface ("GUI") to facilitate graphic user interface processing; instructions 1034 for sensor processing to facilitate sensor-related processing and functions; instructions 1034 for telephony to facilitate phone-related processes and functions; instructions 1034 for electronic messaging to facilitate electronic-messaging related processes and functions; instructions 1034 for web browsing to facilitate web browsing-related processes and functions; instructions 1034 for media processing to facilitate media processing-related processes and functions; instructions 1034 for GPS/Navigation instructions 1168 to facilitate GPS/navigation-related processes; and instructions for camera and video processing to facilitate camera-related processes and functions.

The memory 1030 may also store other software instructions (not shown), such as security instructions, web video instructions to facilitate web video-related processes and functions, and/or web-shopping instructions to facilitate web shopping-related processes and functions. In some implementations, the media processing instructions are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1030. Memory 1030 can also include other instructions that facilitate the implementation of any functionality in any embodiment of the invention.

Each of the above identified instructions and applications can correspond to a set of instructions for performing one or more functions described above. These instructions need not be implemented as separate software programs, procedures, or modules. Memory 1034 can include additional instructions or fewer instructions. Furthermore, various functions of the mobile device may be implemented in hardware and/or in software, including in one or more signal processing and/or application specific integrated circuits.

Turning back to FIG. 10, to the modules disclosed for the storage station 1000 may be implemented via hardware, software or a combination thereof, including the I/O module and communications module that were discussed above.

The power module 1029 tracks energy production, manages its availability, and optimizes its usage. The storage station 1024 has multiple power supplies 1010, including solar energy 1011, batteries 1052, and traditional AC power provided by a utility (not shown). The power module 1024 monitors the available solar energy being generated by the solar panels of the storage station 1000. If solar energy is not available, the power module 1024 will next consume energy from batteries, if any are connected. The power module 1024 manages the recharging, changing, and consumption of these batteries. If the batteries power falls below a certain point, the power module 1024 will stop consuming energy from it and switch to a traditional alternating current power supply. The power module 1024 will track how long each source can power the storage station 1000 and provide alert if the time remaining is less than 24 hours and the storage station 1000 is not plugged into an A/C power supply. The power module 1034 will also run instructions and functions relating to entering sleep mode due to inactivity. In a preferred embodiment, containers will remain secure if the power supply is lost. That is, it is preferable that either a power supply be necessary to provide access to a container or access to a container may be obtained through a mechanical means independent of the power supply.

The security module 1022 executes instructions and functions that evaluate files and incoming data to assess threats to the storage station 1000 or any components thereof. The security module 1022 also monitors data obtained from sensors 1060, video recordings 1081, and audio recording 1085 to identify physical threats to the storage station 1000 and/or any unauthorized attempts to take an item from a storage container 1050. In the event that a person seeks to vandalize or access the containers without authorization, the security module 1022 will execute instructions that will alert the appropriate people, including for example, the manager of the storage station or the local authorities. The security module will also execute instructions and functions that set of security alarms (including for example, flashing lights and audio alarms), instruct the video camera and audio recorder to obtain images of the perpetuator, including any people with him or her, and of his or her vehicle (including his or her license plate), if he attempts to leave the scene in a car. If this person is carrying a smart device that can be detected, the security module will also obtain as much information as possible from the smart device.

The emergency module executes instructions and functions to notify emergency responders. A person must initiate this emergency response. It can do so in three exemplary ways. First, if a person attempts to use the automatic external defibrillator ("AED") in a utility container 1054 of a storage station 1000, the emergency module will automatically report the emergency to first responders in the area. It will also broadcast RF signals (preferably through a predetermined format) to inform a first responder that a health emergency is occurring at the location of the storage station 1000. To protect against false alarms, the AED container 1054 prompts a user to affirm that a person in the public area needs emergency care. Second, any person may use one of the interfaces 1040 to initiate an emergency response. Finally, users may report the emergency to the system through their personal device. In all situations, the user must confirm that an emergency exists.

In general, the delivery module 1026 controls the functionality regarding tracking, replenishing, and replacing inventory. For example, the delivery module 1026 provides an interface for delivery personnel-people hired or employed to deliver items to the storage station 1000. It can set a periodic schedule for deliveries for the delivery personnel (daily, weekly, monthly, etc.) to make deliveries. In between scheduled deliveries, it can analyze what items have been sold or are no longer usable since the last delivery to determine whether a delivery is needed before the next periodic delivery. In this exemplary embodiment, it sends an alert to the delivery personnel so that a delivery is made before the next scheduled periodic delivery.

In another embodiment, the delivery module 1026 can send an offer to a group of authorized drivers to deliver the requested item(s) for a certain price. The price would exceed the local market price for the item to provide a financial incentive to the driver who delivers the requested item(s). This embodiment is advantageous because it reduces the labor costs for stocking and restocking the storage station 1000. The delivery module 1026 also can manage the graphical user interface ("GUI") that delivery personnel and/or delivery drivers use to deliver an item. Importantly, deliverers are required to confirm that any new inventory that he or she picks up for delivery (which may be through a pre-approved sales outlet or a shared warehouse) matches the requested item. Optionally, he or she may be required to inspect the item upon obtaining possession to confirm that it satisfies quality control measures. The delivery interface may also incorporate a QR reader to manage deliveries.

The price module 1029*a*, inventory module 1029*b*, accounts module 1029*c*, and transaction module 1029*d* generally maintain, update, and control the information in the financial and inventory databases 1031, 1032. The price module 1029*a* also contains exemplary methods to price items available in a storage station 1000. A user generally has the option to purchase or temporary use an item from the storage station 1000. In a preferred embodiment, the price for the item is based upon its cost, current market price, delivery costs, whether its new or used, the number of uses, the number of unique uses, the length of use, and adjusted length of use, the current and expected demand for the item, conditions that correlate with the volume of use of a type of item (e.g., because beach towels are used more widely on a hot summer day than a winter day with precipitation), locality, the item's physical condition, the date and day, the time of day, and any other factor that may influence the supply or demand of an item.

To illustrate, a user will pay full price to purchase a new item from a storage station, but he or she will pay less for a used item. The item's cost will decrease as it ages or is used. Likewise, it generally will cost more to temporarily use a new item than an item that has been used in a substantial manner. The pricing module 1029*a* can correlate an item's price with its expected life to spread the costs in an advantageous manner. For example, if a person who uses an item for half of its expected life, he or she may pay a price that factors in the extent of his or her use. If the use is a first use, it will cost more than if the use is a subsequent use.

The amount each user pays can be determined by proportioning the price of the item to each user based on the time they used the item relative to the total time the community of users used the item. For example, an item costing $100 was used or is expected to be used by a community of users for a total of 1000 hours. A user who used the item for 2 hours would pay for $2/1000$th of the total price of the item. Since the item was worth $100, they would pay 20 cents, which is based on the proportion of time they used the item compared to the total time the item was used. A user who used the same item for 100 hours would pay $10 dollars, since 10% of the community's total time using the item was taken up by the individual user (100/1000). These amounts may be further adjusted on other data, including the extent of the previous use of an item. To illustrate, using the same example, a user may pay $15.00 for the first 100 hours of use if the item is new, but only $5.00 for the last 100 hours of use.

The pricing module 1029*a* may also price an item for purchase even though a user indicates that they will return the item so that if a user decides that he or she wants to keep an item from the container, he or she is permitted to take and keep the item and will be charged the determined price to purchase it. If the item is new, the new user-owner will pay the full price. If the item is used, the user will pay less.

In an exemplary embodiment, the pricing module 1029*a* can reconcile past payments on certain used items that are bought or reaches the end of its useful life. For example, if an item is very old, users who had previously used it may be credited so that they are charged an amount that is aligned with their proportional use. In a certain embodiment, where there is a fixed community of users, they may agree that everyone will pay for their proportional use of the item minus either the resale amount if the item is purchased or a proportion of the resale price. Of course, this reconciliation would likely not apply if a storage station 1000 were being operated to maximize a profit. It should be apparent that there are infinite ways to price an item and the preceding examples should not be read to limit the invention.

The control module 1027 is operably connected to one more containers 1050. The control module 1027 may operably connect to more than one part of a container, including for example, a first portion and a second portion of the container 1050 where that both of said portions contain a lock or security device. In another embodiment, the container operably connect a first portion and a second portion of the container where both of said portions contain a lock or security device, including via a wire that is adjacent or attached to the container 1050. In an exemplary embodiment, the control module 1027 controls access to the containers.

The control module 1027 can be operably connected to a plurality of containers 1020 in multiple ways, including for example, a dedicated wire or circuit to each container 1020, a shared wire or circuit to the plurality of containers, daisy-chaining, wireless communication, a mechanical means, a magnetic means, or a combination thereof. In a preferred embodiment, the containers 1020 are secured in the absence of a signal or energy supply to protect their contents during a power disruption. In In another embodiment, the control module 1027 can also control a moveable member wherein the moveable member has a first position where it prevents access to all containers 1020 and a second position where it provides access to at least one container 1020. In a preferred embodiment, the movable member has sufficient positions to provide access to each of the containers 1027.

Figure 14:
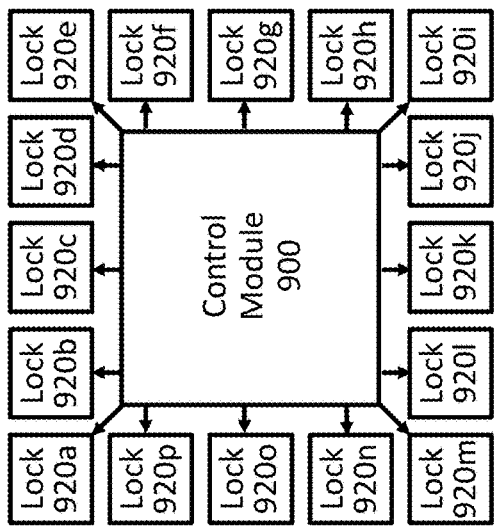
FIG. 14 is a schematic diagram of an exemplary control module.
Figure 13:
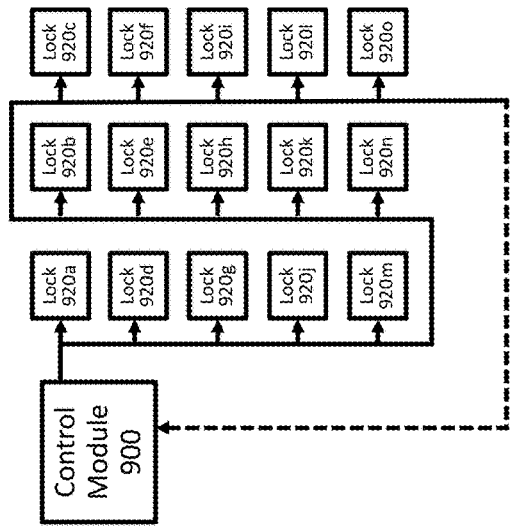
FIG. 13 is a schematic diagram of an exemplary control module.
Figure 12:
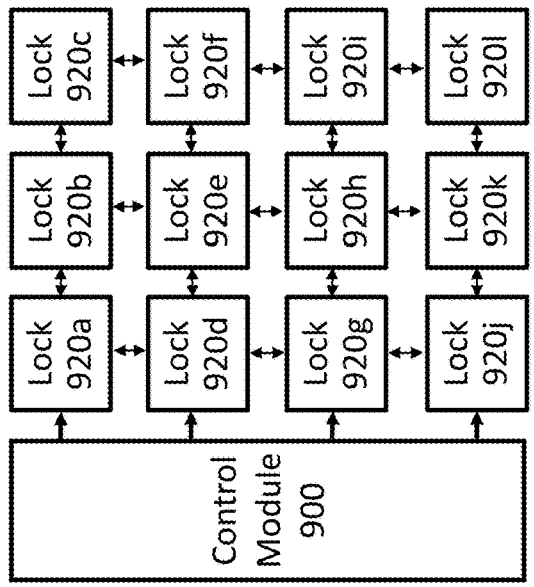
FIG. 12 is a schematic diagram of an exemplary control module.

FIGS. 12-14 are schematic diagrams of exemplary configurations of a control module 900 and a plurality of locks 920. For purposes of this disclosure, a lock encompasses any member or combination thereof with a first state that prevents access to a container and a second state that allows access to a container, where the first state may change to and from the second state mechanically, magnetically, electronically, or a combination thereof. It should be understood that the example configurations shown in FIGS. 12-14 may be rearranged and/or combined to create other configuration and in no way serve to limit the claimed invention.

Although the containers are not shown in FIGS. 12-14, the locks 920 generally are operably connected to a container. In some instances, a container may be operably connected to a plurality of locks 920 where each lock 920 provides access to a container. For instance, the container may have a first portion with a first lock and a second portion with a second lock, wherein each lock controls access to the container. In a preferred embodiment, a user accesses the item with a first lock on the front portion of the container while a manager or delivery person (e.g., delivery personnel or a delivery driver) access the container via a second lock located on the back portion of the container.

FIG. 12 shows an exemplary lock configuration where one or more locks 920 operably communicate with each other. For example, the control module 900 can provide access to the container secured by a first lock 920a directly but relies on the first lock 920a (including the container thereto) to pass the signal to a second lock 920b. The first lock 920a may process the signal or relay it unprocessed. When all the locks relay unprocessed signals, FIG. 12 is equivalent to FIG. 13. In another embodiment, the locks 920 may process the signal. In this embodiment, the control module may send a signal indicating that locks 920a and 920c should allow access to the containers. Lock 920a would process this request, provide access and pass the signal on to lock 920b. Lock 920b would process the request, not provide access, and pass the signal to lock 920c. The end result would be that only access to lock 920a and lock 920c would be provided. An advantage of this embodiment is its reliability, i.e., the control module can open a single lock in multiple ways. Another benefit of this configuration is scalability; locks may be easily added if desired.

FIG. 13 shows a control module 900 that controls a daisy-chain configuration of locks 920 that may be controlled by a single wire. In the simplest embodiment, the control module serves as a multiplexer. The advantage of this configuration is reduced wiring. Optionally, the last lock 920 may send the signal back to the control module 900 to detect errors in the chain.

FIG. 14 illustrates an exemplary arrangement where the control module 900 connects to each lock 920 via a dedicated wire. This configuration is most appropriate when a control panel is located within a short distance of each lock 920. See FIGS. 6-8. A benefit of this configuration is a lock 920 will not be negatively affected if another lock 920 fails.

FIG. 15 illustrates a movable member 1520 that provides access to containers. The member 1520 has a keyhole 1530. The locks 920 are secured through an elongated body attached thereto where a key 1530 is located on the opposite end of the body in relation to the lock. The member 1520 rotates as directed by the control panel 900. Each lock 920 has a key 1530 that allows it to be accessed when the desired lock's key 1540 is lined up with the keyhole 1540.

FIG. 16 illustrates an exemplary of a configuration using a flexible, relatively non-elastic band 1620 to control each lock 920. The band 1620 may be cable, wire, or anything with sufficient strength to withstand attempts to break it. It is threaded through the end 1620 of a plurality of elongated members 1610 that are operably part of a lock. A container is secure when the elongated member 1610 is pulled away from its respective lock as shown in FIG. 16. The container may be accessed when an elongated member is allowed to move inward 1610a. The control module controls the tension in band 1620 either through its own pulley or having the ability to move the elongated ends 1610. When the band 1620 is released, slack is created that allows one or more of the containers to open. In a preferred embodiment, the band 1620 will only create slack to allow a limited number of containers to open.

FIG. 17 illustrates an exemplary configuration of a plurality of containers operably connected to a lock 920 comprising a moveable bolt 1720 and a structure 1730 with a plurality of mortises 1740 that align with said bolt 1720. The control module 900 is adapted to control each bolt 1720 to provide access to the respective container for each lock 920.

FIG. 18 depicts a container 1810 and a handle 1820 on a surface of the container 1810 that is securable by a claw 1830. The claw 1830 comprises a first joint 1840 and a second joint 1850. The first joint operably connects the structure 1860 and a first member 1870. The second joint operably connects the first member 1870 and the second member 1880. The container 1810 is aligned within the structure 1860 so that when it is pushed into the claw 1830, the claw 1830 secures the handle 1820. The first joint 1840 can be moveable in a vertical direction so that the claw releases the handle 1820 thus making the container 1810 accessible. Alternatively, the first joint 1840 and the second joint 1850 can both be rotatable. When the first joint 1840 is rotated in a counterclockwise direction, the members 1870, 1880 both rise and eventually the claw 1830 releases the handle 1820 thus making the container 1810 accessible. The advantage of the claw 1830 is that the container 1810 may be easily inserted into the structure 1860.

Figure 19:
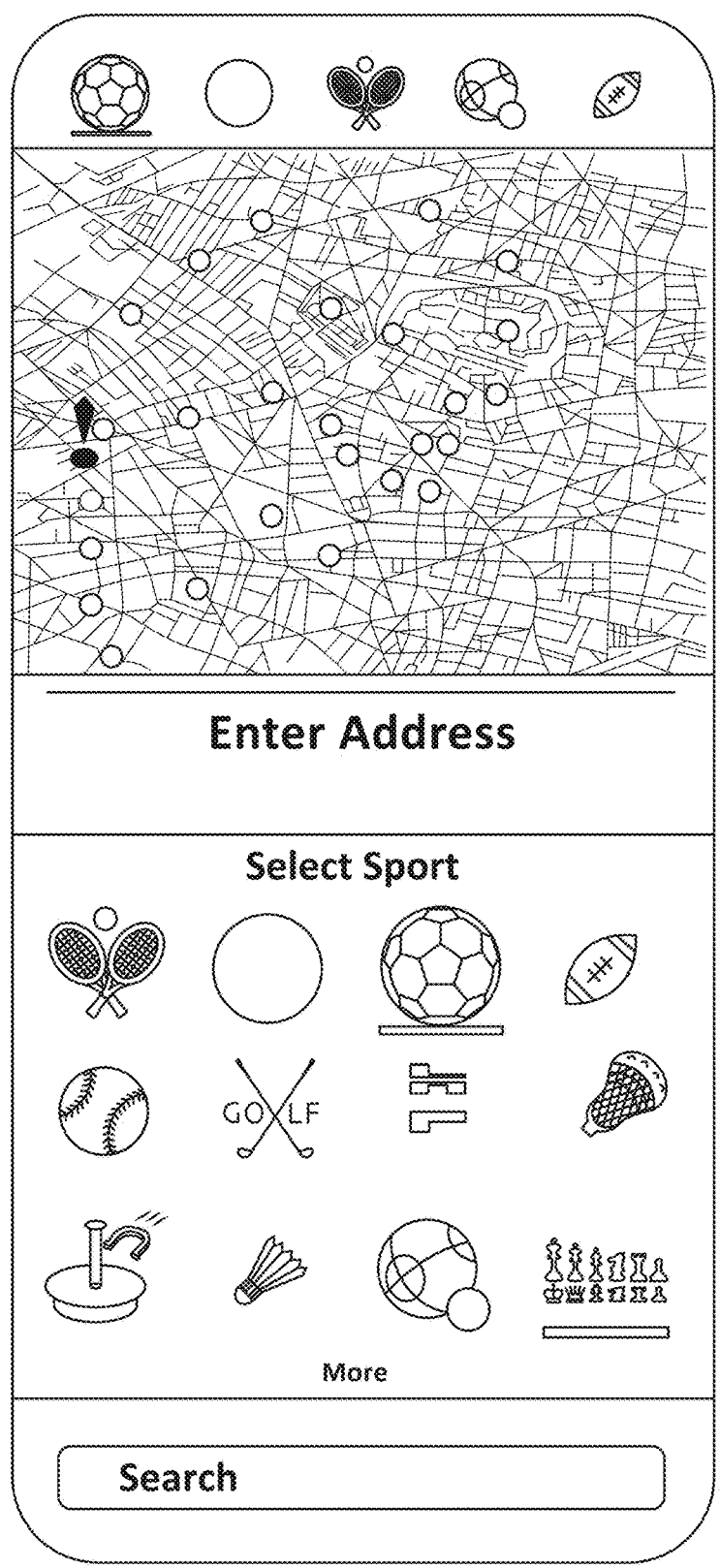
FIG. 19 provides an examples of exemplary user interfaces.
Figure 19:
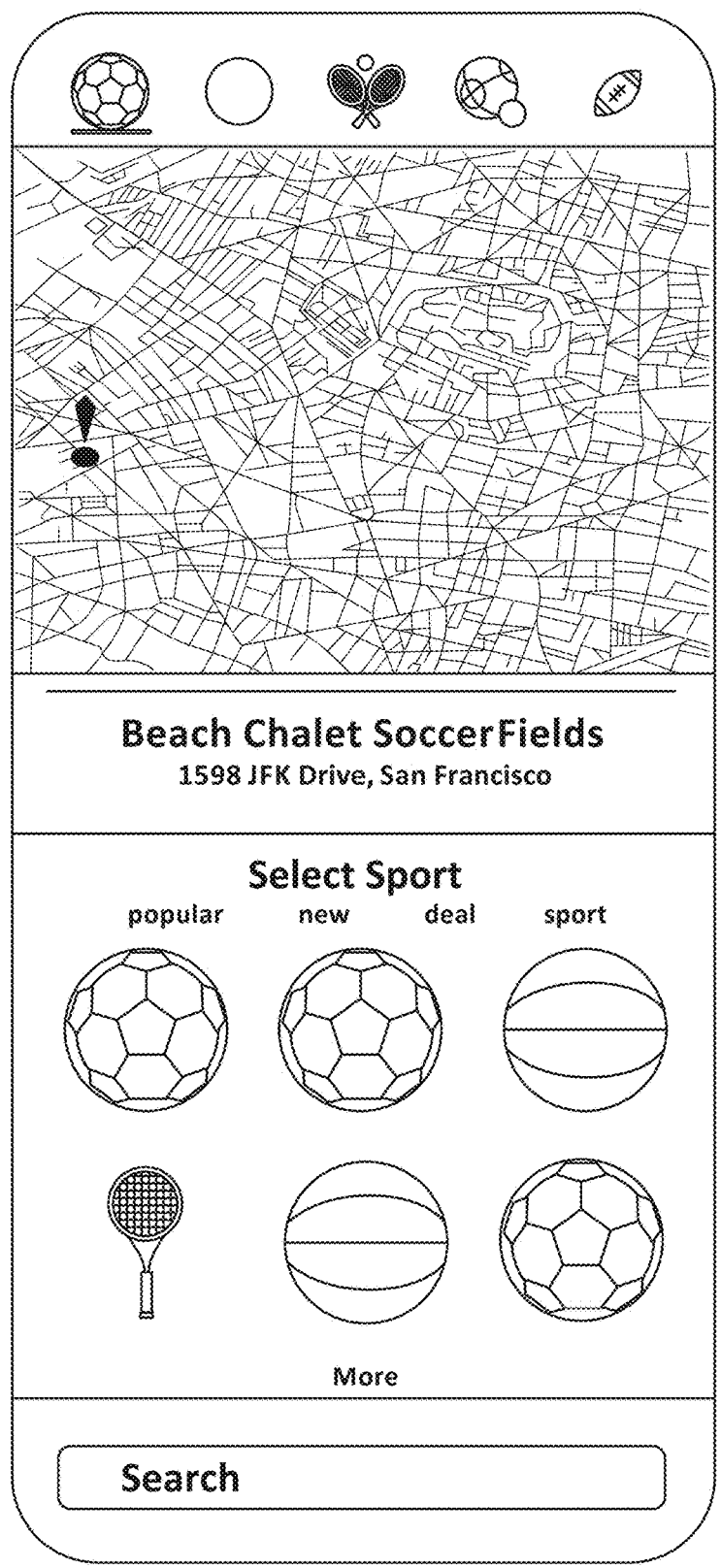
Figure 19:
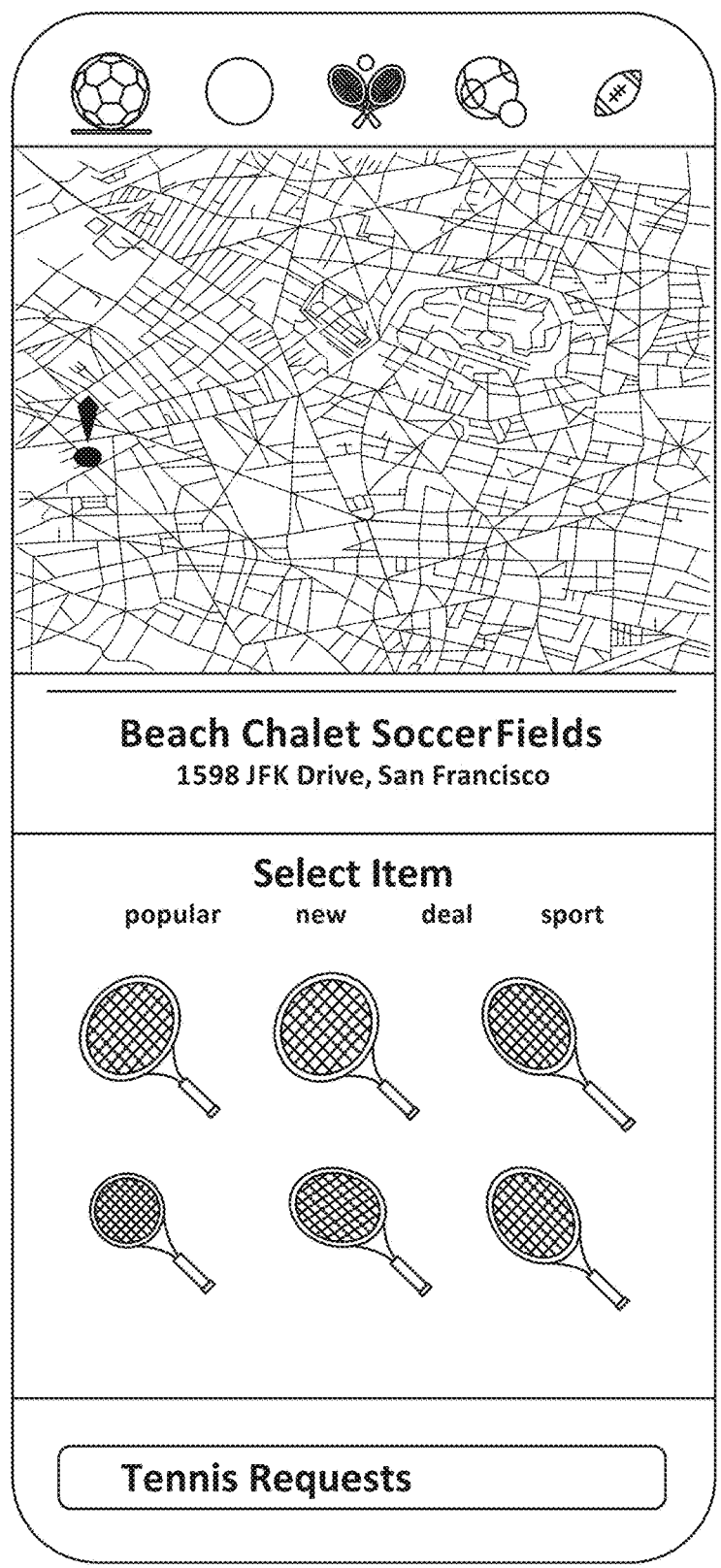
Figure 19:
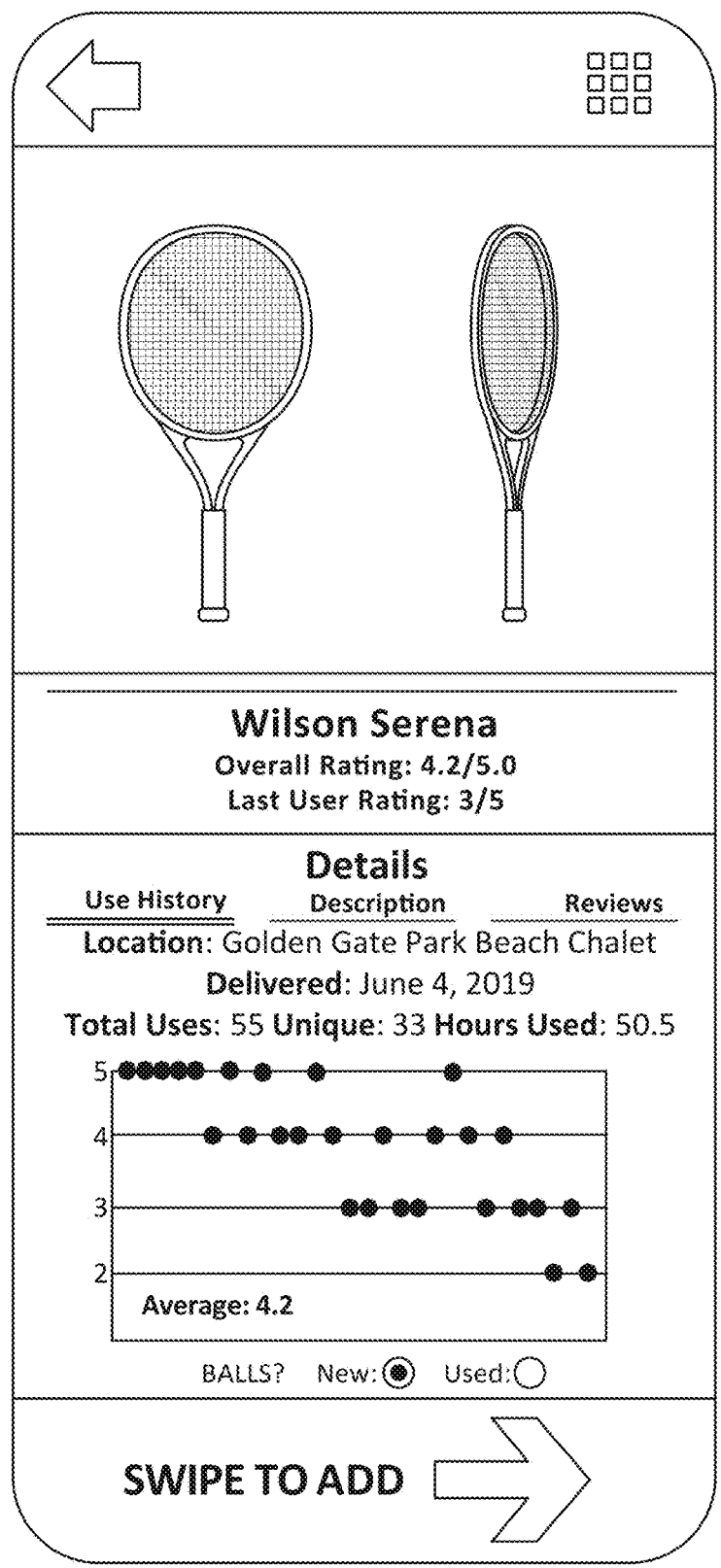
Figure 19:
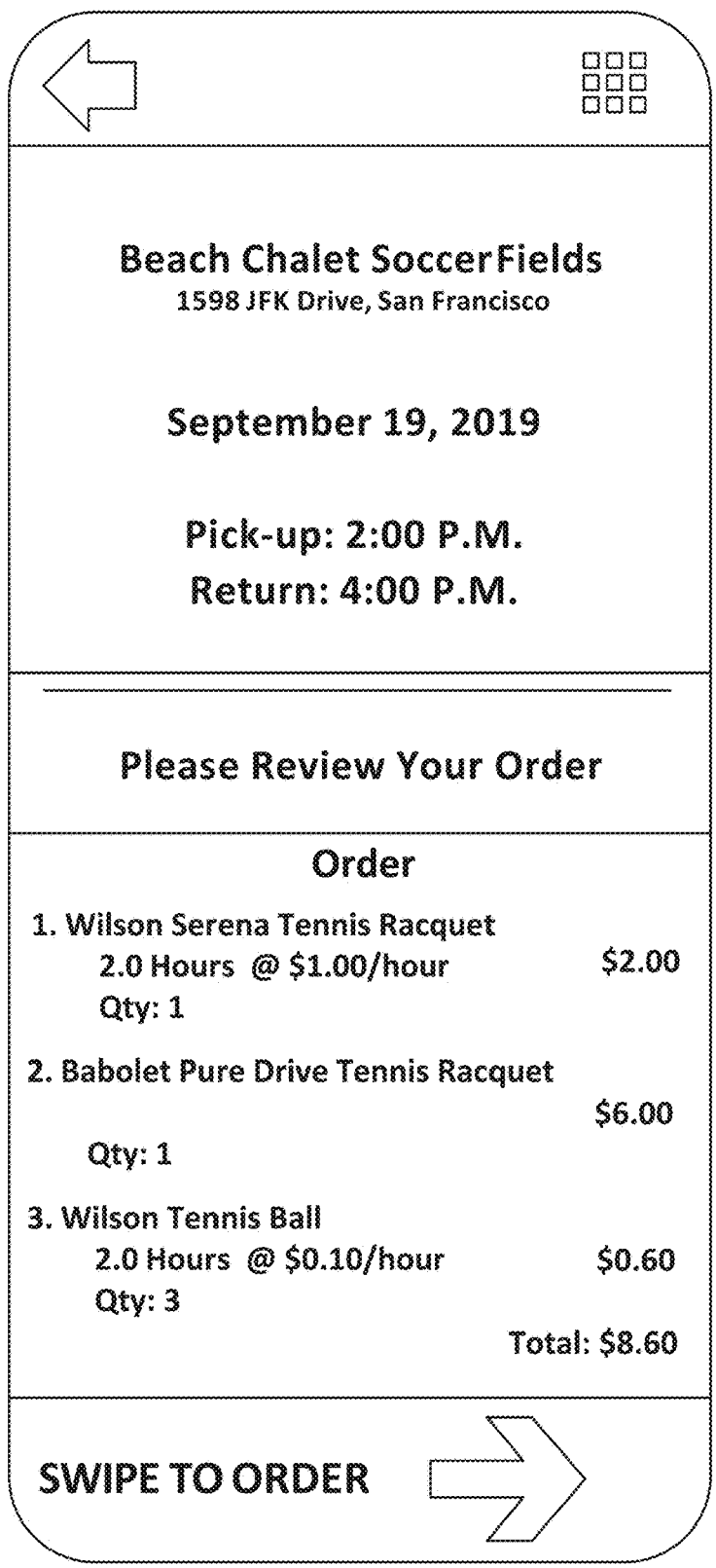
Figure 19:
Figure 19:
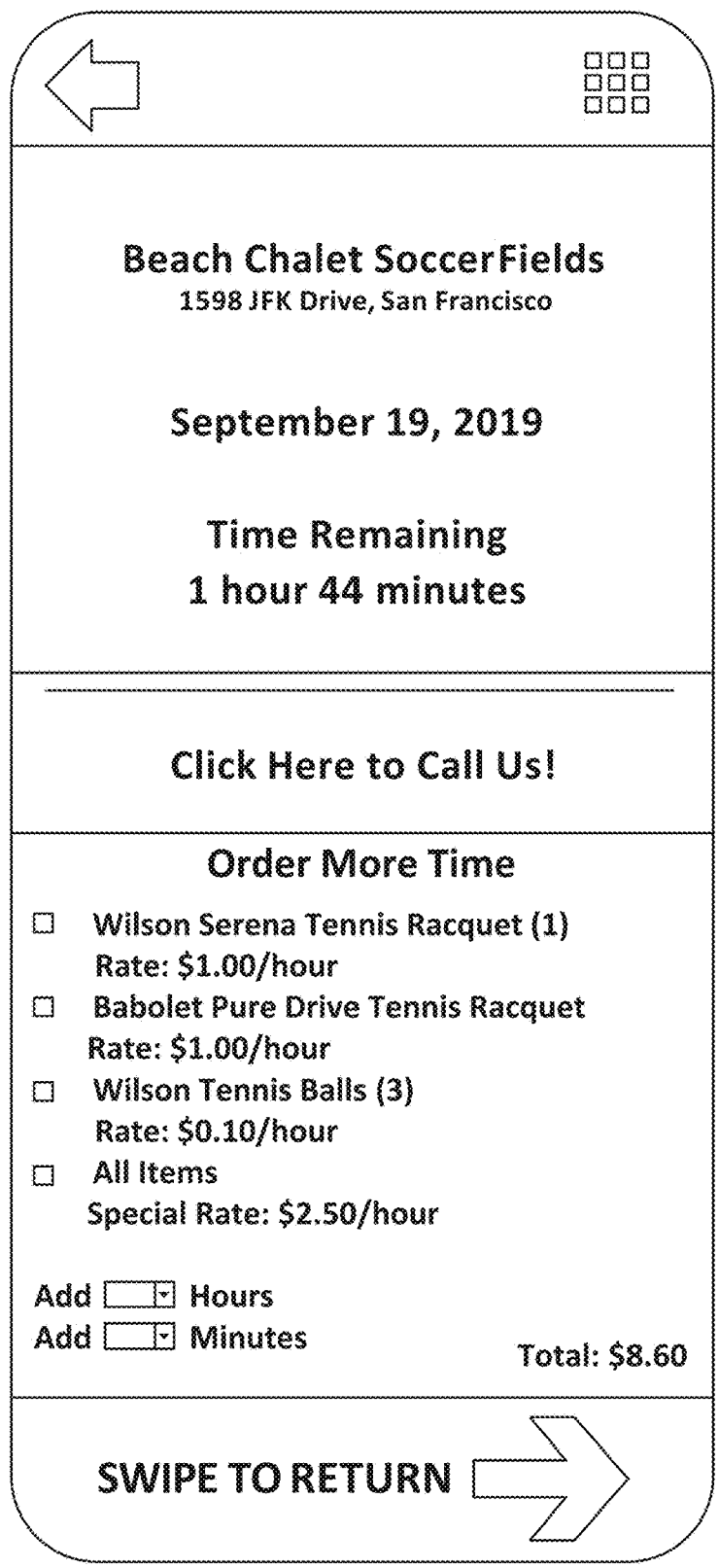
Figure 19:
Figure 19:
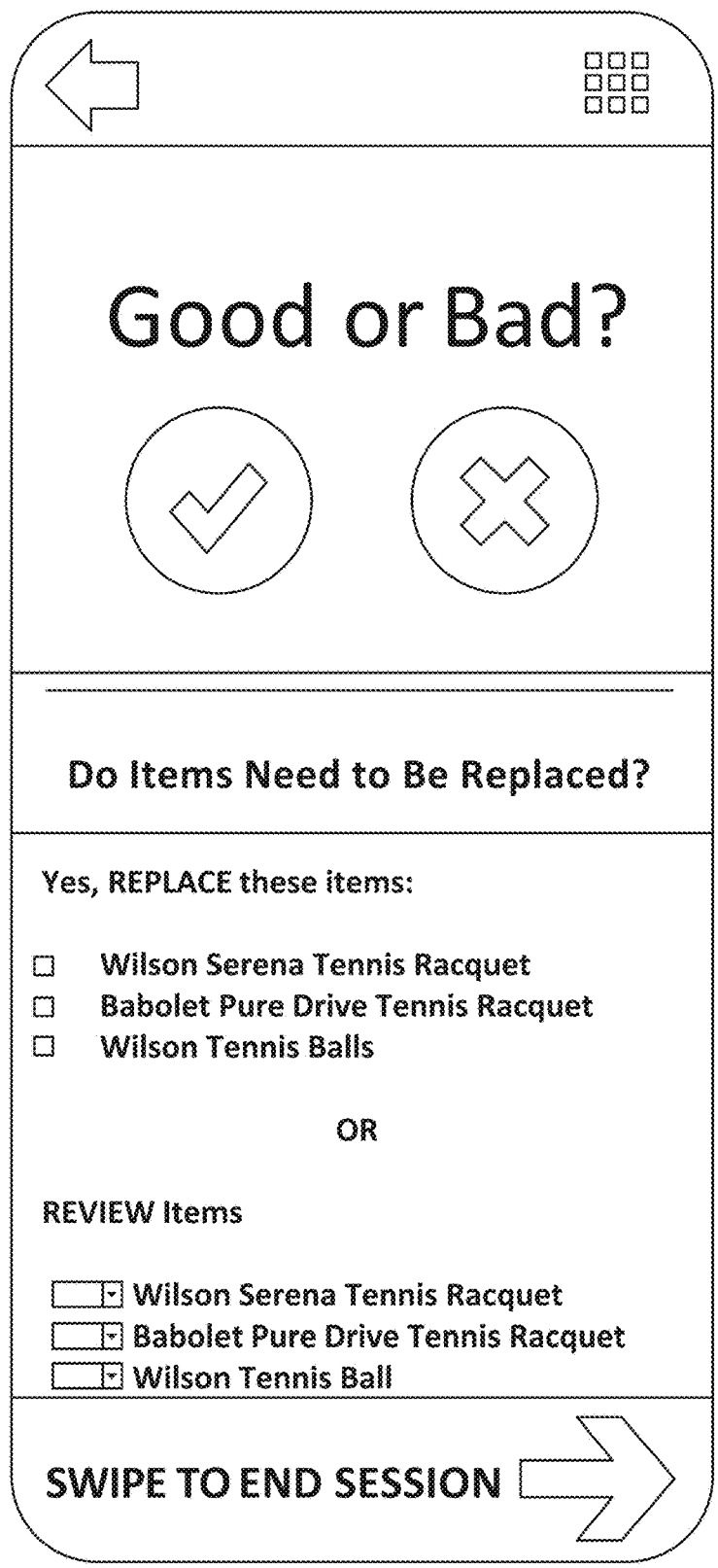

FIG. 19 illustrates example screenshots of a GUI for an end user to use an exemplary shareable storage system. In a preferred embodiment, each GUI is tailored to a class of users, including backend operators, delivery personnel, and ordinary users. The GUI may be on a storage station, a user device via a downloadable software application, an Internet portal, a web browser, or any combination thereof. It is understood that a GUI may contain numerous displays and the examples herein serve to illustrate without limitation. It is also understood that some embodiments may function, partially or wholly, without a GUI, including for example, embodiments where the storage station is used for automatic deliveries.

More specifically, FIG. 19 provides an exemplary flowchart with corresponding examples of screenshots of a GUI for an end user to search, select, obtain, and return an item. First, a storage station receives a search parameter from a user phone where the search parameters may be determined automatically, including for example, GPS location, proximity to storage station, scheduled events, prior uses, last use, or a combination thereof. Search parameters may also be entered manually through a GUI 1900, including for example, address, city, state, availability, sport, equipment, item, games, contests, or a combination thereof. The storage station may receive and process one or more search parameters 1900. Optionally, the storage station may receive a first search parameter, filter a plurality of items that satisfy the first search parameter, display one or more of the filtered items, and receive a second search parameter to further filter the filtered items 1910.

After the one or more searches are processed to filter items that satisfy the one or more search parameters, an item may be selected to obtain information regarding the item 1930. The selected item may be added to an order 1940 along with information regarding date and time of use. When the user has finished selected items for his or her order, a summary is provided with an option to place the order 1950. Once the order is completed, the user receives a QR code to unlock the items at the storage station at a certain time and place 1960. Optionally, the user may be required to confirm receipt of the items. While the user has the item temporarily, an option to add more time may be provided through the GUI 1970. To return the item, a QR code is used to unlock the container and the user is asked to confirm that the item is returned 1980. To end the session, the user must answer whether the item needs to be replaced 1990.

FIG. 20 illustrates examples of exemplary storage containers. As mentioned above, a container 2000 may take many shapes or sizes. A container 2000 is shaped to hold an item. A container 2000 may be made of materials that are sufficiently strong and durable, including for example, clay, fibers, glass, Styrofoam, rubber, wicker, metal, durable cardboard, plastics, wood, or a combination thereof. In a preferred embodiment, a storage container 2000a has a first handle 2010 and a second handle 2010 on opposite sides where the handles 2010 also serve as lock rings. See FIG. 18. Optionally, the container 2000a has a portion, preferably the bottom, with a grip 2011 to allow easier handling.

A container 2000b may hold an inner container 2020. The inner container 2020 may hold an item or a second inner container. In this embodiment, the counter 2000b can be opened (preferably by sliding) and the inner container 2020 removed. The inner container 2020 is protected which allows it to be composed of more materials. For instance, an inner container 2020 may be a cardboard package, a picnic basket, grocery bags, etc. An inner container 2020 is also desirable because it facilitates the standardization of regular containers 2000b. It should be apparent that a container may hold more than one inner container, and an inner container may hold a second inner container.

Optionally, a container 2000c includes a sub-compartment 2030 that is adjacent to a portion of the container 2000c. In a preferred embodiment, the sub-compartment 2030 is adjacent to a bottom portion of the container 2000c. The sub-compartment 2030 and the container 2000c is separated by a perforated divider 2031. The sub-compartment 2030 may hold objects to keep items held in the container 2000d in good condition, including for example, disposable dehumidifier packets, insect repellent, heating or cooling packets, sensors, a scale, or a peripheral device.

In an exemplary embodiment, the sub-compartment 2030 is accessible to a limited group of users. For example, a container 2000c may comprise of a first portion with a first access point that is accessible to a first group of users (e.g., customers) and a second portion with a second access point that is accessible to a second group of users (e.g., maintenance people, delivery personnel, etc.) wherein the sub-compartment 2030 is only accessible through the second access point. A control module preferably may control each access point. In a preferred embodiment, at least one access point is controlled by touch, sound, gesture, scent, physical proximity, biometrics, a release button 2040, a release lever, a sensor or touch pad, a keypad, a touchless keypad, facial recognition, oral passcodes or instructions, or a combination thereof. Controlling an access point in this manner allows a delivery person to open and close the containers quickly, i.e., without entering data on a separate device or via an out-of-reach interface.

In another embodiment, a container 2000d can retract from a structure 2001. For example, the interior wall 2002 of a structure 2001 can operably connect to the exterior wall 2051 of the container 2000d so that the container 2000d can retract into and out of the structure 2001. Preferably, a first track 2061 on interior wall 2002 of a structure 2001 operably connects to a second track 2060 on the exterior wall 2051 of the container 2000d so that the container 2000d may slide into and out of the structure 2001. In one embodiment, the first track 2060 and second track 2061 comprise ridges, cavities, or a combination thereof. In alternative embodiments, hardware such as drawer slides are used to operably connect the container 2000d and the structure 2001 so that the container 2000d may retract into and out of the structure 2001. In an alternative embodiment, the tracks described herein may be contained on the exterior of an inner container and the interior of a container so that the inner container may slide out of the container.

Preferably, a container 2000d cannot be pulled completely out of the structure 2001. For example, a peg 2073 can be attached to the interior portion 2002 of the structure 2001 where a cord 2074 (such as a rope, cable, chain, or band, preferably elastic) that is fastened or attached to the inner container 2050 and the peg 2073 to prevent the container 2000d from being completely removed. The first track, the second track, or both may also have bumpers 2070 to slow down or stop a container from moving. The bumper 2070 also informs the user that further movement of the container 2000d is limited.

FIG. 20 further illustrates the use of bumpers 2070 to slow movement of a container 2000d. It also depicts pegs 2073 and cord 2074 that prevent a user from removing a container 2000d from a structure 2001 (or an inner container 2000d from a container 2001). While in rest, the container 2000d is in the structure 2001 as indicated by the first two blocks 2080. In 2081, the container 2000d retracts from the structure 2001. Preferably, ridges on each respective track will require more force to pull the container 2000d after it has retracted a certain distance from the structure 2001. Preferably, as shown in 2081, the container 2000d will easily move until the bumpers 2070 meet. After the bumpers meet 2082, the container 2000d extends a little further but it is harder to pull due to the bumpers 2070 and/or increasing friction between the first track 2060 and the second track 2061. In 2083, the cord 2073 has reached its capacity thus preventing the user from removing the container 2000d. Preferably, the container 2000d returns to its position in the structure when it is released. For example, the cord 2074 may be elastic so it pulls the container 2000d back into the structure 2001 as shown in 2084. The container 2000d may also be forced to return to the structure 2001 with magnets, which is preferable in a storage system where magnetic devices secure the locks using magnetic forces.

Containers 2000 may be non-electric or electric. Non-electric storage containers are not connected to a power supply and are preferably the most common type of container in a storage system. In contrast, containers that supply or receive power are electric containers.

The first type of electric containers provide energy to the storage station, including for example, with a battery therein. The second type of electric containers require a power supply, including for example, containers that are refrigerated, heated, or capable of charging an item in the container. In some embodiments, an electric container 2000 may be operably connected to a heater, air conditioner, dehumidifier, scale, camera, or other periphery device. The periphery devices may be held in or adjacent to the container 2000. They may also be held in a sub-compartment 2030 of the container 2000c. Containers 2000 holding a periphery devices provide multiple advantages, including for example, controlling the climate of a container, determining whether an item has been returned, and evaluating the item's condition upon return.

A storage container 2000 may have additional features. For example, a portion of the container 2000 may contain an area for advertisements. The advertisements are preferably operably connected to a storage station and provide advertisements based upon user information and data from the storage station. The area for advertisements may also provide coupon codes. The user interface may display advertisements and/or deliver digital coupons. In some embodiments, the storage station may also print receipts, advertisements, coupons, or a combination thereof. An advertisement or coupon may be displayed or offered to a user based upon one or more characteristics of the user, weather conditions, location, time of day, date, season, inventory, manufacturer information, market information, item information, or a combination thereof.

A user may also be provided a coupon or offered other consideration for completing a task (trying a new item, going to a new storage station, post themselves using items on a social media). In a preferred embodiment, the storage station may run prize contests and deliver prizes to a winner of the contest between or among a plurality of users. For example, a storage station can be adapted to determine who wins the contests using, for example, data from users, participants, cameras, sensors, smart audio, or a combination thereof. To illustrate, the storage station may run a race contest with a $10.00 prize with a $1.00 entry fee. It will provide the users who entered the contest with a starting place, a start time, and a finish line. It will video record the race and optionally use other data, including input from participants or witnesses, to determine the winner of the race. It will deliver the prize to the winner(s).

In contrast to a storage container, a utility container is not used for storage. Utility containers generally serves useful purposes. A utility container may contain a first aid kit. An accessible first aid kit would allow people to promptly treat injuries which are frequent occurrences at public areas due to the physical activity that takes place. Similarly, a utility container may contain an automatic external defibrillator ("AED")-including for example, AEDs manufactured by Philips® or ZOLL®-which would save lives because each minute without treatment increases the likelihood that a heart attack will result in death. A utility container may contain a control panel for the storage station. In another embodiment, a utility container may be a trash receptacle, a battery, a heater, refrigerator, or other useful device.

A preferred embodiment of a battery container is depicted in FIG. 21. The bottom portion 2110 of a container 2100 (or a structure) contains battery terminals 2120 that supply power to the storage system when a battery is connected. In other embodiments, the battery terminals 2120 are part of a sub-container or a shell. For clarity, "battery container" used herein means the container or sub-container which contains a battery. Preferably, at least one of the battery terminals 2120 form a path 2121 to guide the battery container 2130. In FIG. 21, the battery container 2130 is an inner container dimensioned to fit into the container 2100. The bottom surface of the battery container 2130 has one or more connecting members 2140 and a guiding member 2141 wherein the guiding member 2141 is designed to follow the path 2121 formed by the battery terminals 2120. Preferably, the guiding member 2141 is not conductive.

Optionally, the battery container 2130 has an alignment indicator such as a fitted groove and recess on two or more adjacent surfaces that click or become tangibly snug when two surfaces are aligned correctly, i.e., a user can feel that they are aligned. The alignment indicator may also be a light, a recorded message, a beep, or a combination thereof. Once the user places the battery container 2130 correctly into the structure or container 2100, he or she can secure the battery container 2130.

Preferably, the battery does not connect to the battery terminals 2120 until the battery container 2130 is secured. For example, the connecting members 2140 may comprise one or more terminal connectors 2150 that operably connects to the battery terminals 2120 where the connecting members 2140 have a first position and a second position. In the first position, the terminal connectors 2150 do not contact the battery terminals 2120. In the second position, the terminal connectors 2150 contact the battery terminals 2120.

The dotted arrows in FIG. 21 illustrate the movement of the connecting members 2140 from a first position to a second position. In the second position, the terminal connectors 2150 contact the battery terminals 2120. Preferably, the connecting members 2140 may not move into the second position unless the battery container 2130 is secured. Alternatively, the battery container 2130 is secured as the connecting members 2140 move into the second position. The described container 2130 facilitates a fast, easy delivery of battery power to a storage stations.

Figure 22E:
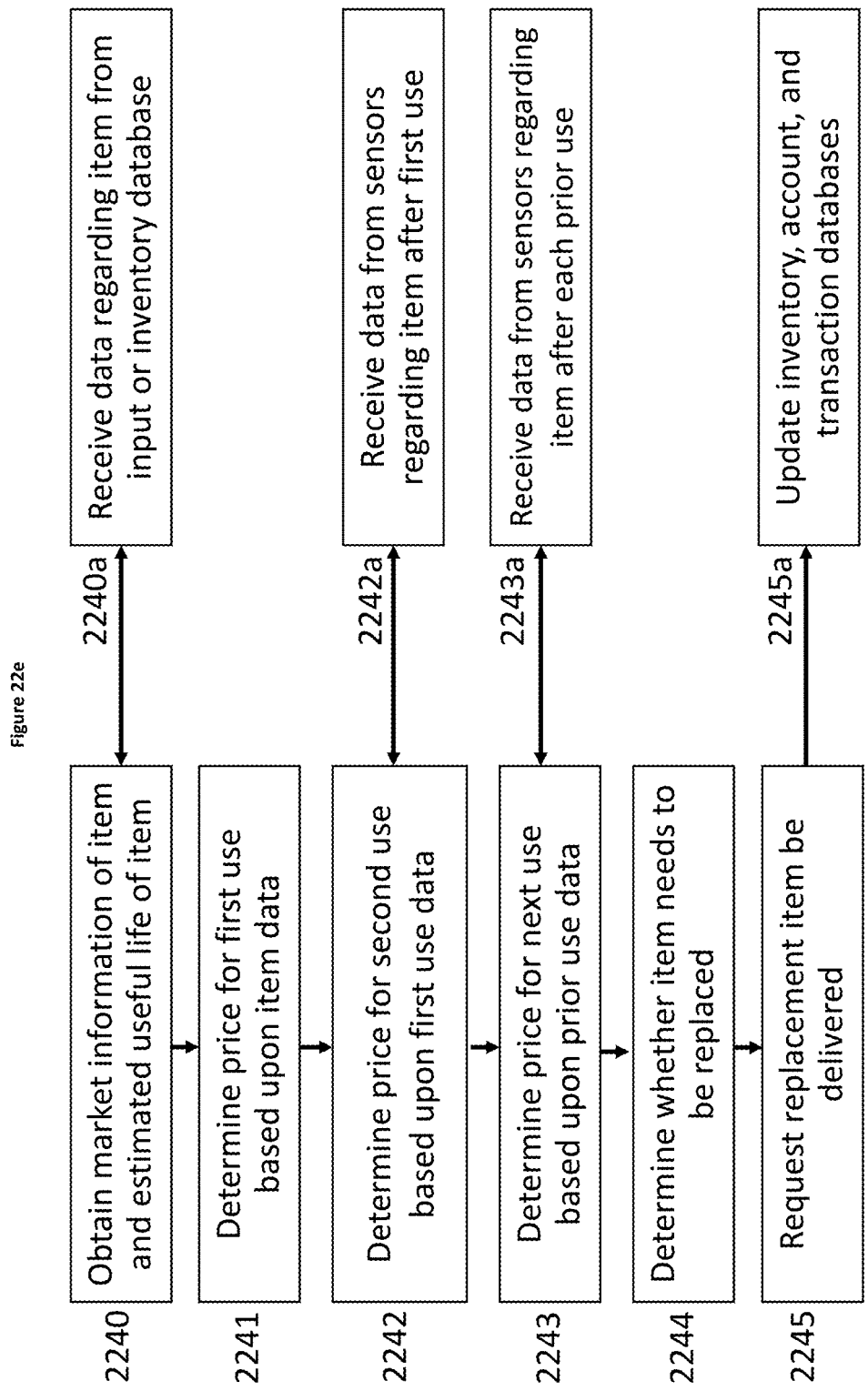
FIG. 22 provides flow charts with exemplary steps of methods disclosed herein.

FIG. 22 provides exemplary flow charts of the present invention. More specifically, FIG. 22a provides exemplary steps 2200-2205 for a user reserving an item for temporary use; FIG. 22b provides exemplary steps 2210-2215 for a user reserving and obtaining an item; FIG. 22c provides exemplary steps 2220-2225 for providing a user access to a container with an item that he or she ordered for temporary use; FIG. 22d shows exemplary steps 2230-2235 to manage and replenish inventory at a storage station; FIG. 22e shows exemplary steps 2240-2245 for pricing an item at a storage station; and FIG. 22f provides exemplary steps 2250-2255 to delivery inventory to a storage station.

The features of the processors, modules, peripherals, sensors, interfaces, or any other component with digital logic component described herein (the "computing features") can be implemented in digital electronic circuitry, or in computer hardware, firmware, software, or in combinations of them. These features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The computing features can be implemented advantageously with one or more computer programs that are executable on a programmable system including at least one programmable processor coupled to receive data and instructions from, and to transmit data and instructions to, memory, at least one device adapted to receive data or user input (including for example, sensors, peripherals, interfaces, from user devices, or a combination thereof), and at least one device adapted to render or respond to output data (including for example, displays, interfaces, locks, peripherals, containers, user devices, or a combination thereof). A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both.

A storage station can include a processor for executing instructions and one or more memories for storing instructions and data. Optionally, a storage station may also include, or be operatively coupled to communicate with, one or more devices for storing data files; such devices include magnetic disks, such as internal hard disks and removable disks; magneto-optical disks; and optical disks. Devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, a storage station may have a display device such as a CRT (cathode ray tube), LCD (liquid crystal display) monitor, or LED (light-emitting diodes) for displaying information to the user and a keyboard, a mouse or a trackball, or a pointing device (e.g., a finger or stylus on a touch-sensitive surface or touch-sensitive display) by which the user can provide input to the computer. A storage station also interact with a user by operably communicating with a user device, including directly or indirectly.

A sharable storage system can include a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

A sharable storage system can include clients and servers. A client and server are generally remote from each other and typically interact through a network. The relationship of client and server arises by virtue of computer programs running on the respective computers and having a client-server relationship to each other.

One or more features or steps as disclosed herein can be implemented using an application programming interface ("API"). An API can define one or more parameters that are passed between a calling application and other software code (e.g., an operating system, routine, function) that provides a service, provides data, or performs an operation or a computation.

The invention can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desired results. Other steps may be provided or eliminated, from the described flows, and other components may be added to or removed from the described systems. Accordingly, other implementations are within the scope of the present disclosure.

Although the present invention's embodiments and the method of using the same according to the present invention have been described in the foregoing specification with considerable detail, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A storage station apparatus, comprising:
   a structure;
   one or more containers operably connected to said structure, the one or more containers configured to store one or more items wherein each item is held in the one or more containers;
   a retractable security gate that secures the one or more containers during times of unavailability of the storage station apparatus;
   a processor controls access to at least one of the one or more containers;
   an interface wherein a user may select an item from the one or more items;
   a power supply wherein said power supply is solar-powered, battery-powered, electricity from a grid, or a combination thereof, wherein the processor operably communicates with a database that contains information regarding users, the one or more items, the storage station apparatus, or a combination thereof, wherein the processor provides access to one of the one or more containers to allow the user to return the selected item, wherein the structure of the storage station apparatus is a bench, the bench including a sitting portion, a backrest portion, and at least one hand rail along a side of the bench, the one or more containers being located below the sitting portion of the bench, wherein the processor calculates a first price for purchase of the selected item and the processor calculates a second price for temporary use of the selected item, the second price based upon a proportion of a new cost of the selected item, the proportion based on a length of time of temporary use of the selected item by the user and an expected total length of time of use of the selected item by a community of users.

2. The apparatus of claim 1, further comprising:
one or more sensors operatively connected to the processor wherein the sensors include a magnetometer, a gesture sensor, a gyroscope, a humidity sensor, a thermometer, a weight scale, a pressure gauge, an open/closed sensor, a light sensor, an accelerometer, a motion sensor, a water detector, or a combination thereof.

3. The apparatus of claim 2, wherein at least one of the one or more sensors is attached to one of the one or more containers.

4. The apparatus of claim 3, further comprising:
one or more peripherals operatively connected to the processor wherein the peripheral includes a video camera, an audio recorder, a RF receiver, a RF transmitter, an optical receiver, an optical transmitter, or a combination thereof.

5. The apparatus of claim 4, wherein at least one of the one or more peripherals is attached to one of the one or more containers.

6. The apparatus of claim 1, wherein the processor calculates a second price for temporary use of the selected item of $10 when the new cost of the selected item is $100, the length of time of temporary use of the selected item by the user is 100 hours, and the expected total length of time of use of the selected item by a community of users is 1000 hours.

7. The apparatus of claim 1, wherein the processor calculates the second price at a lower price than the proportion of a new cost of the selected item, the proportion based on the length of time of temporary use of the selected item by the user and the expected total length of time of use of the selected item by the community of users, after an extent of previous use of the selected item passes a threshold amount of use.

* * * * *